May 4, 1937. H. STARK 2,078,982
DEVICE FOR USE IN CONNECTION WITH OPERATION OF AIRCRAFT
Filed Dec. 7, 1934 8 Sheets-Sheet 1
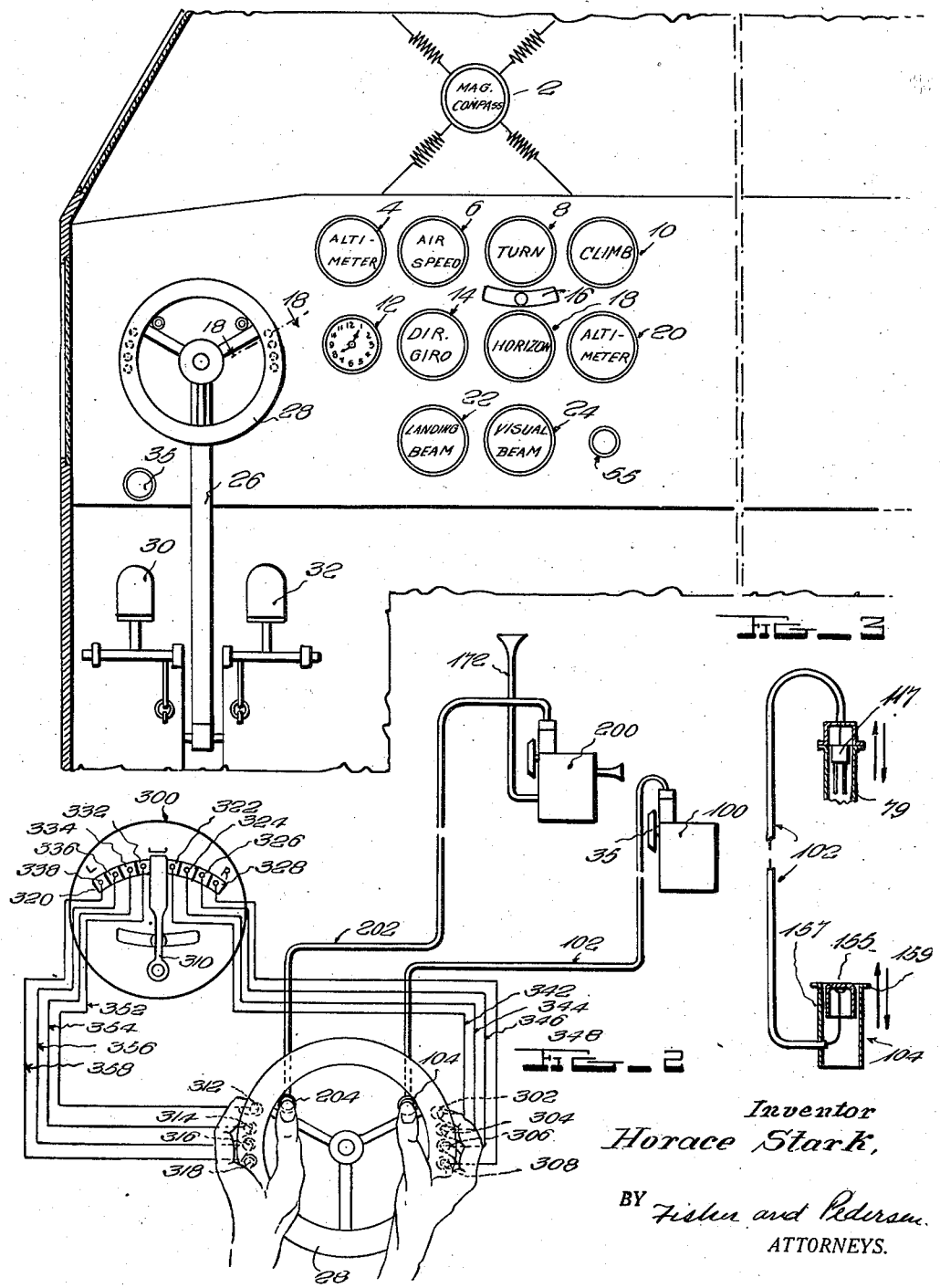
Inventor
Horace Stark,
BY Fisher and Pedersen
ATTORNEYS.

May 4, 1937.   H. STARK   2,078,982
DEVICE FOR USE IN CONNECTION WITH OPERATION OF AIRCRAFT
Filed Dec. 7, 1934   8 Sheets-Sheet 2
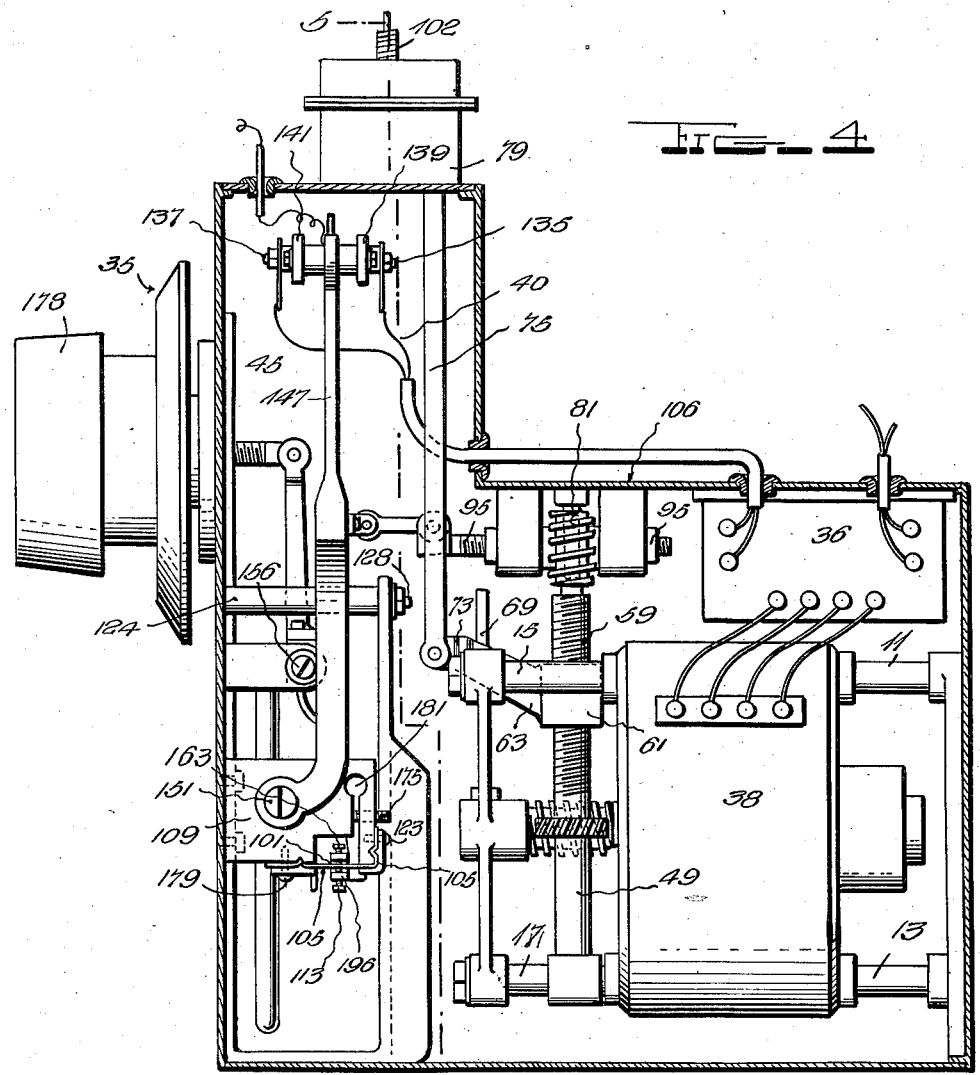
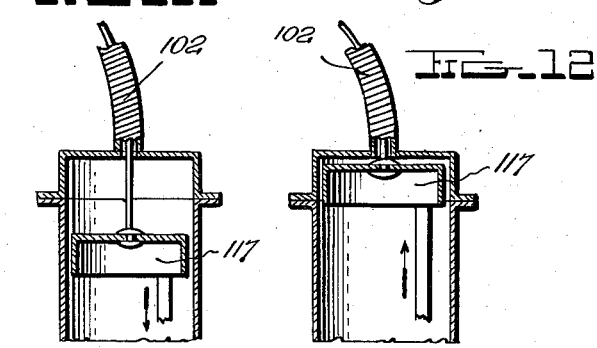
Inventor
Horace Stark,
BY Fisher and Pedersen
ATTORNEYS.

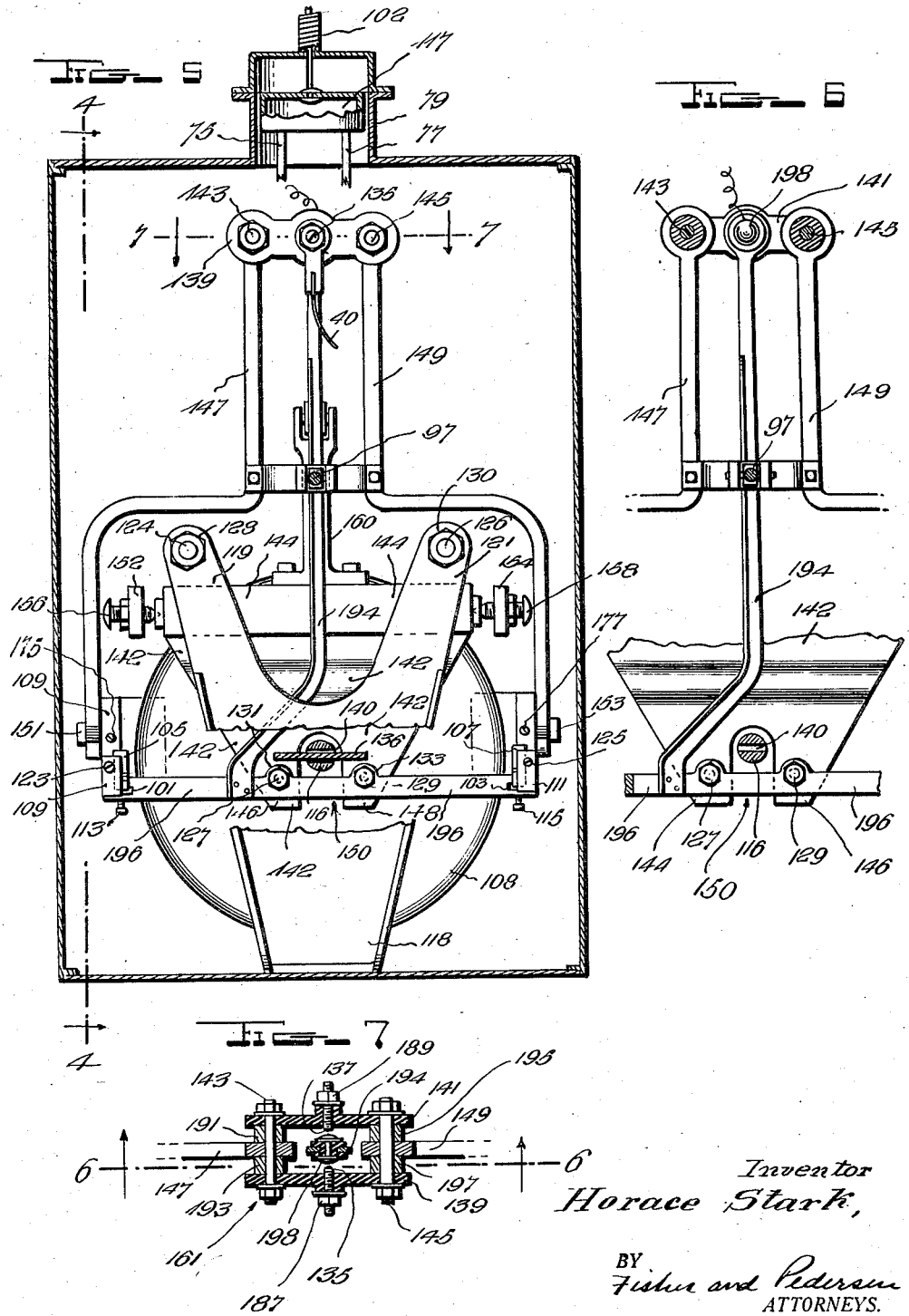

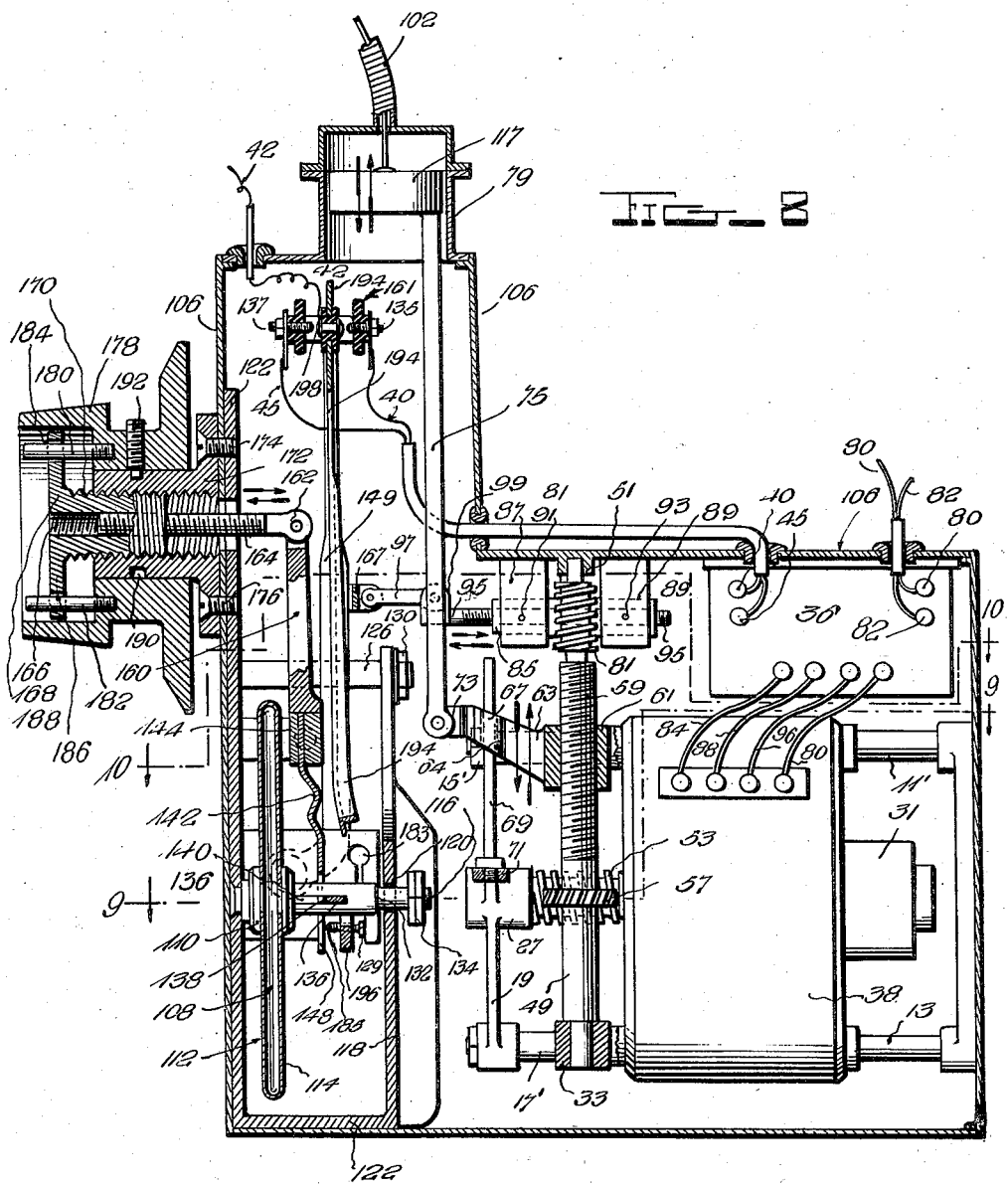

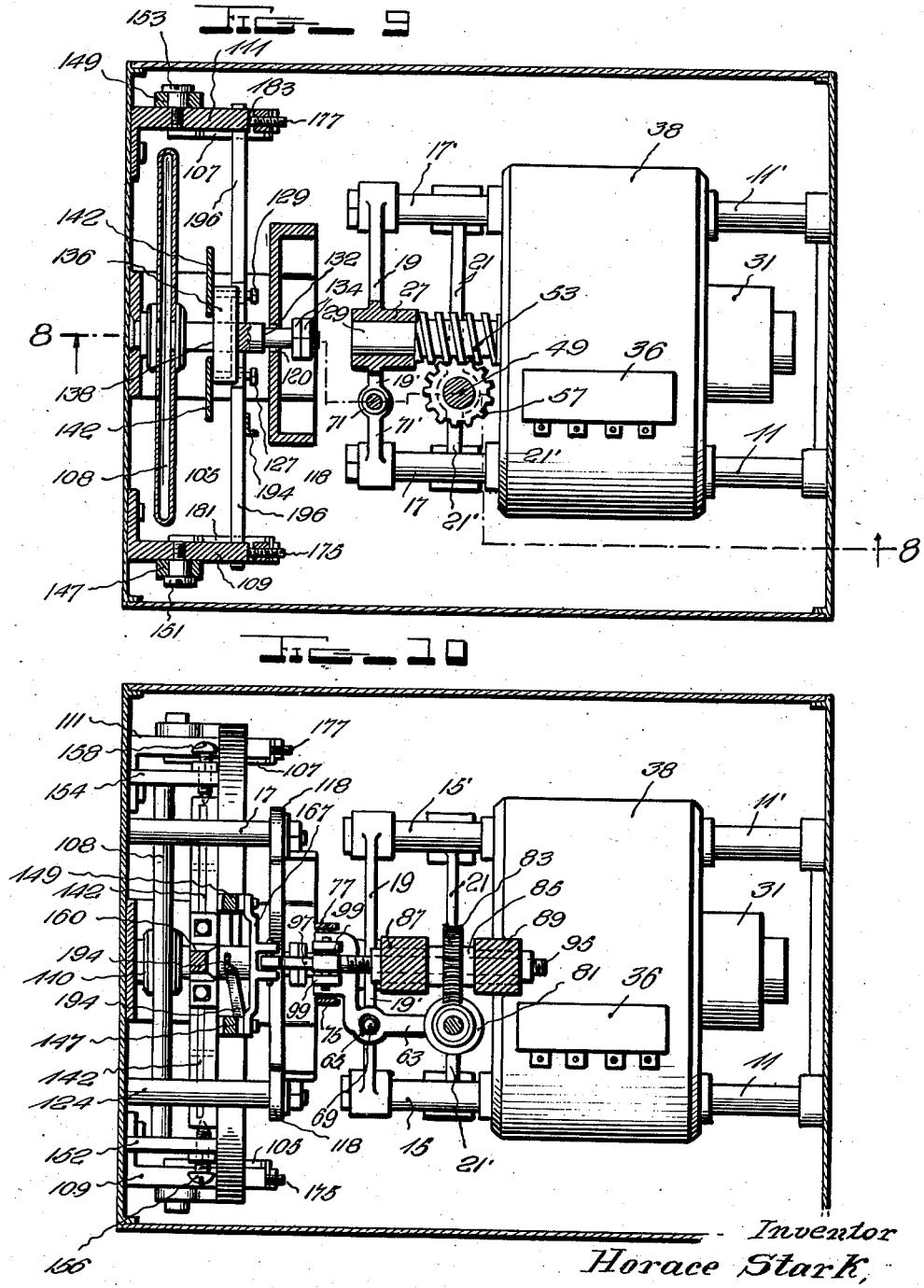

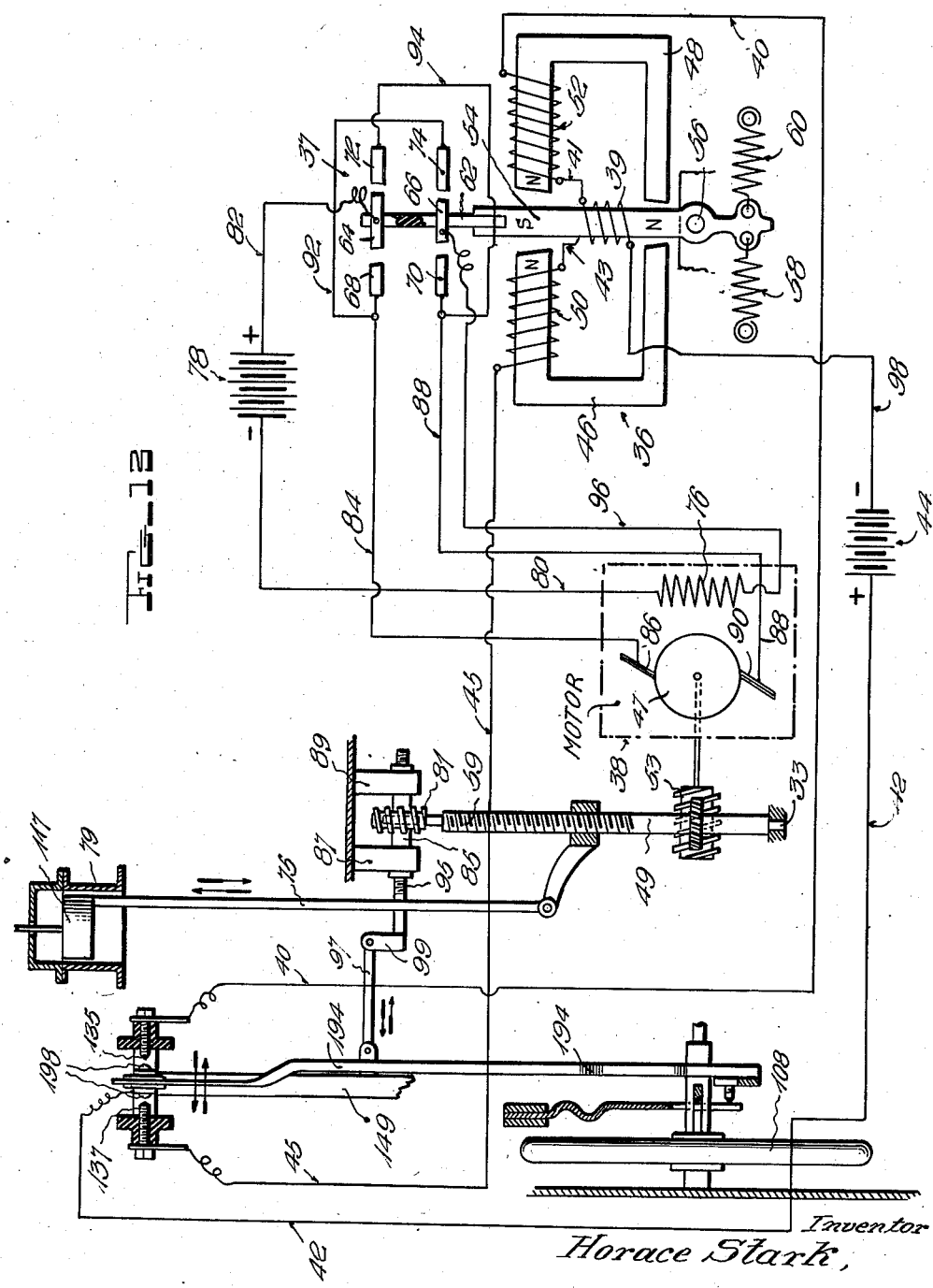

May 4, 1937. H. STARK 2,078,982
DEVICE FOR USE IN CONNECTION WITH OPERATION OF AIRCRAFT
Filed Dec. 7, 1934 8 Sheets-Sheet 7
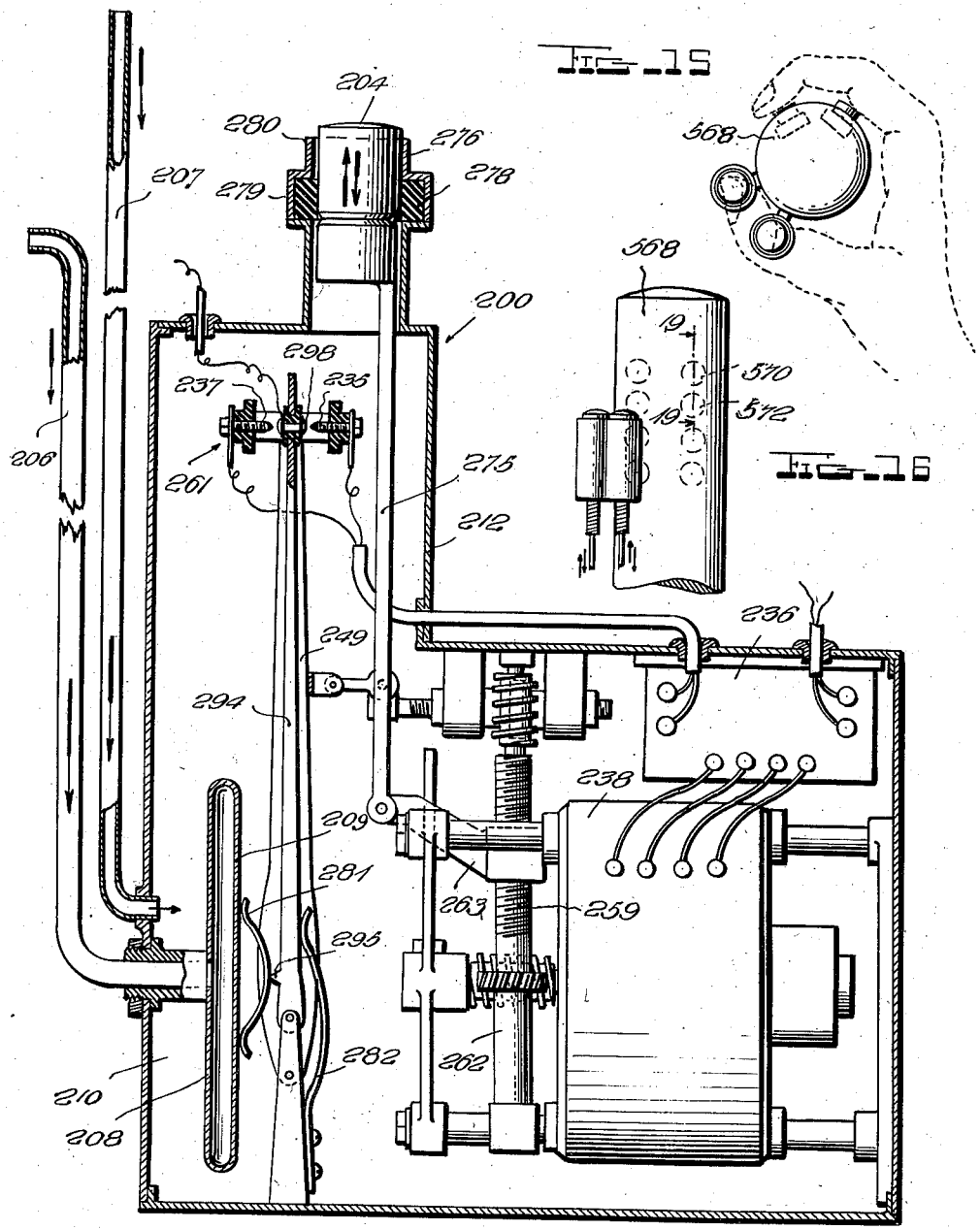
Inventor
Horace Stark,
BY
Fisher and Pedersen
ATTORNEYS.

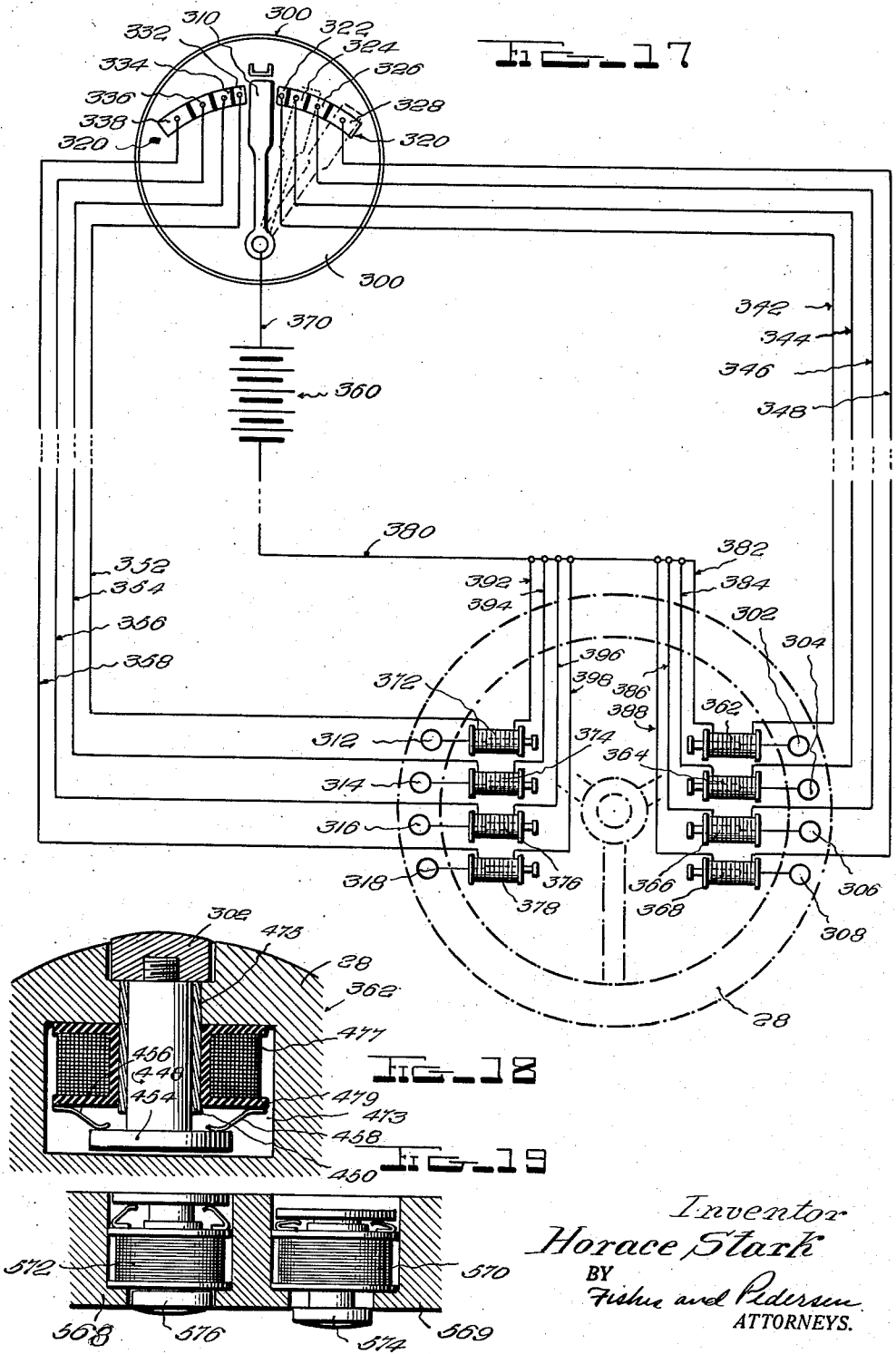

Patented May 4, 1937

2,078,982

UNITED STATES PATENT OFFICE 2,078,982

DEVICE FOR USE IN CONNECTION WITH OPERATION OF AIRCRAFT

Horace Stark, Washington, D. C.

Application December 7, 1934, Serial No. 756,535

24 Claims. (Cl. 244—1)

The present invention relates to aircraft operation and more particularly to a novel system for the operation of airplanes or aircraft and to certain improvements in connection with airplane instruments by which the flying and operation of airplanes is greatly improved and by means of which blind flying is made easier, more certain and less fatiguing to the pilot or operator.

In the system of airplane operation used up to the present time, it has been necessary for the pilot or operator to refer to and to read, at frequent intervals, various instruments necessary for determining factors in flight, including the altimeter, speed indicator, turn indicator, climb indicator, compass, gyro compass and other instruments and to translate the readings into terms of comparison with the desired values or predetermined readings or with the prior readings of the instruments.

As a result of the necessity of constant watch of the instruments, particularly in connection with blind flying, and the necessity of mentally translating the readings of the instruments and of making changes in flight in accordance with the readings, the present system for the operation and control of airplane flight is exceedingly fatiguing and becomes hazardous after a long flight, or when fog or storms are encountered, due to the excessive fatigue involved in properly managing and controlling the plane.

It will be understood that in normal operation of a plane the pilot's attention is necessarily scattered, particularly in making landings or take-offs at night, and during fog or bad weather, due to the necessity of reading instruments at the time when the pilot's attention is most needed in connection with the operation of the machine. At such times the operator's attention is generally focused on certain of the instruments, such as the altimeter, the landing beam, air-speed and climb indicator; and in addition it is frequently necessary to give special attention to radio reception, in order to receive instructions from the landing field.

The necessity of watching instruments and concentrating on so many factors at one time renders it substantially impossible for the pilot to judge the speed and normal flight attitude of the plane and it is difficult therefore under such conditions to skillfully bring the plane to the ground or to take-off in the way that the plane would be handled if it were not necessary to concentrate on so many factors not directly connected with the manual handling of the plane.

The present invention serves to furnish the operator with all of the indications or information which he would otherwise obtain by the direct reading of instruments and translating the readings into elements or factors of flight, but the information is transmitted by means of a novel method or system without the necessity of directly reading the instruments, thus permitting him to keep a lookout outside of the plane and to focus his attention directly on the flight attitude of the plane during flight and during take-offs and landing of the plane.

The invention, hereinafter fully described, is based upon the discovery that the principal factors of flight may be transmitted to the pilot by means of tactile stimuli, or through the sense of "touch" or "feel" in such a manner as to be already interpreted or translated into comparison with the desired or predetermined value for the particular factor, thereby relieving the pilot of a large part of the concentration heretofore required in properly conducting a flight.

It will be understood in connection with the invention that while the use of a large number of instruments has become quite general, particularly in the larger commercial planes, their positions on the instrument board have not become standardized. It is necessary for the pilot therefore to familiarize himself with the position of the various instruments in each plane which he operates, which contributes in a considerable degree to the effort required in connection with the handling of commercial planes. This necessity of searching more or less for a particular instrument which it is desired to read obviously adds to the fatigue in instrument flying, in having to concentrate on or reflect as to where to find a particular instrument and then to determine the reading which must be compared with the desired reading or factor and with other factors of the flight.

The means and devices as hereinafter described may be employed as a separate system for blind flying. Under the conditions in which blind flight or instrument flying is resorted to, the pilot, in accordance with this invention, controls or operates the plane in exactly the same manner as he does in ordinary flying in the use of the invention by receiving information as to the various flight factors through tactile stimuli, and is thus enabled to handle the aircraft more skillfully under blind flying conditions.

It will be understood from the above that in the use of the invention both in ordinary flying, and in blind flying, the information or tactile reading of the various factors is communicated to the pilot in general in terms of relative values rather than absolute values, thus obviating the necessity of comparing the indications obtained with the desired reading or factor and relieving the pilot of much of the mental effort or concentration heretofore required in analyzing or interpreting the information obtained. It will be understood however, that certain readings or factors may be desired without comparison with any base reading, and in such cases the direct reading may be transmitted to the pilot by the tactile means as will be clear from the following detailed description.

The system hereinafter described obviously greatly simplifies blind flying and serves to promote a feeling of security in the handling of aircraft, particularly because of the fact that in accordance with this invention blind flying and ordinary flying are carried on in substantially the same way. It will be understood, therefore, that the invention is one which renders blind flying easier and more accurate, in that the pilot obtains substantially continuous practice in the use of the devices during ordinary flight and develops a high degree of skill in the use of the invention, so that actual blind flight is rendered relatively easy and simple. The invention serves also to overcome to a great extent the strain and tension in blind flying and to overcome much of the conscious effort on the part of the pilot in ordinary flying. It will be recalled that in the ordinary plane the position of the scales or indicators of the various instruments on the instrument board are necessarily spread over a substantial area and it requires a separate reading of each instrument in succession to obtain the necessary information as to the flight factors required. In the present invention, on the other hand, the various factors are transmitted to the pilot substantially simultaneously, or as coordinated factors to a relatively small area under the hands or fingers of the pilot.

It will be obvious that in the use of the invention, the pilot or operator becomes skilled after a time in receiving, through tactile stimuli, the information as to the various flight factors, so that such information is received substantially subconsciously in much the same manner that the pilot receives flight factor information or becomes aware of the conditions of flight from direct observation by which certain associated factors are coordinated or taken into consideration without particular attention to any one factor alone. In other words, by the use of this invention the pilot receives substantially simultaneously the various flight factor tactile stimuli from the tactile units which are connected to the flight factor measuring instruments, or in other words he receives in effect the coordinated impressions at one time from the various instruments, by which he is enabled to guide the aircraft with more or less sub-conscious effort. This invention obviously obviates the necessity of referring to the readings or indications of the instruments on the instrument board, except as a matter of checking the readings from time to time at comparatively long intervals.

It will be clear from the above that in the use of the devices hereinafter described, the pilot is not dependent upon receiving information by the direct reading of the various instruments and information by means of the tactile units is transmitted to the pilot at substantially the time that deviations occur or, in other words, substantially simultaneously with the occurrence of the deviations, so that corrections may be made more or less by instinct rather than by reasoning, so that alterations or corrections in flight are made almost immediately, thereby greatly increasing the accuracy in maintaining the course. The receipt of the flight factor information or indications occurs, furthermore, without requiring visual effort and in a manner so as not to divert the pilot's attention from the manual work of operating the plane, whereby the operation and control of the plane is based in effect upon flight factor instrument readings, supplemented by the pilot's observations of the flight attitude of the plane, thus providing increased accuracy and increased safety in the operation of the aircraft.

In the handling or operation of a plane in accordance with the system heretofore used, it is obvious that as relatively slight deviations of the plane from its course occur, such deviations are not ordinarily noticeable to the pilot. For example, if the plane loses altitude to the extent of from 10 to 20 feet, this deviation would not normally be noted by the pilot if the change does not occur abruptly. Similarly, if the plane deviates slightly in direction, the pilot does not ordinarily become aware of it until he again checks up on the magnetic compass or the gyro compass and finds that the plane has deviated from the course to some extent. By the use of the present invention, the information as to deviations in altitude or in direction is transmitted to the pilot immediately by means of the corresponding tactile units with which his hands are in contact and the deviations thus become apparent to him at once without conscious effort. The deviations may be corrected immediately therefore as they take place. As a result of making corrections at the time the deviations occur, the plane is maintained on a substantially straight course and at substantially a constant elevation during flight, whereby certain of the instruments, such as the compass, operate with a greater accuracy than can be obtained in ordinary flight, thereby increasing the efficiency in the handling of the plane to a considerable extent.

One object of the present invention is to provide a new system for the operation of airplanes, particularly with reference to lessening the labor involved during a flight incident to the reading of instruments and in translating the readings, checking the flight, or for the making of corresponding corrections in the line of flight or of altitude, whereby flying may be rendered safer both under ordinary flying conditions and under abnormal or dangerous conditions.

Another object of the invention is to provide a series of flight factor instruments which are adapted to indicate constantly to the pilot, through the operation of tactile units under the hands or fingers of the pilot or by means of manual tactile stimuli, the manner in which, or conditions under which the airplane is flying, so as to obviate the necessity of making readings on the instrument board except for the purpose of checking readings at long intervals in order to make certain that the indicators of the tactile units agree with readings of the instruments on the instrument board.

A further object of the invention is to provide a system for the operation and control of aircraft through the sense of touch or "feel" by which flight factor information or indications equivalent to the readings of the instruments on the board are automatically transmitted to the pilot or translated for him, in effect, into comparison with the particular value or reading which it is desired to maintain.

The indication as to altitude, for example, which is transmitted by tactile means to the pilot may be automatically compared for example with the altitude which it is desired to maintain. In making an ascent or descent to a given level, also, the altimeter tactile instrument may be set for indications with reference to the particular altitude, so that upon reaching the particular level the tactile unit will give the indication automatically so that no particular attention need be given during the interim to the visual altimeter.

Similarly, by the use of this invention, the degree of turn on the tactile turn indicator is transmitted to the pilot in the manner hereinafter explained, by means of which the pilot is informed whether or not the plane is being turned at an unsafe angle or at an unsafe speed but without the necessity of reading or visually referring to the turn indicator.

Another object of the invention is to provide a system for the controlling of airplane flight which is adapted for determining or indicating certain other factors of flight in plane operation which ordinarily require mental calculations or visual observations, or which involve excessive expenditure of energy in the notation of the factors and which may, in a similar way, be transmitted to the operator through tactile stimuli to the fingers or hands of the pilot.

Another object of the invention is to provide certain novel devices which may be used in connection with the operation of aircraft or the handling of planes so that the system for the operation and flight of commercial airplanes may be modified to permit flying over the same route at different levels, whereby planes travelling in one direction may fly at one level and those travelling in another direction may fly at another level. It will be apparent that by the use of such a system, signals for one lane or route of travel could be used for aircraft travelling in opposite directions. Furthermore, by means of the altimeter tactile instrument or levelometer device hereinafter described, the possibility of collision by the use of a single route would be substantially avoided and the cost of operation of aircraft over a given route would be greatly decreased.

A further object of the invention is to provide a system for translating the readings of flight factor instruments into manually received tactile indications or registrations which may be communicated to the pilot through the sense of touch or "feel" or his fingers or hands, by which the pilot may be made continuously aware or conscious as to whether or not the plane is flying in a proper manner, at the desired altitude, speed, or direction and at the desired angle in the making of turns.

Another object of the invention is to provide certain improvements in instruments by which the various essential factors in flight may be indicated to the pilot through the sense of touch, which factors may also be directly read if desired, on the instrument board for the purpose of checking the "feel indication". It will be obvious that by the use of an additional independent source for receiving the flight factors, an added sense of security is given to the pilot when the two systems agree, and a warning or indication is given when the two systems or sources of flight factor information do not agree.

It will be apparent in considering the means hereinafter described that this novel system of flying by the sense of touch or "feel" may be used without substantial effort and without the usual fatigue on the part of the pilot in the making of long flights.

With these and other objects in view the invention comprises the method and apparatus together with the various features of the invention and combinations hereinafter described and more particularly defined in the claims.

The various features of the invention are illustrated in the accompanying drawings, showing the preferred embodiment of the invention, in which:

Fig. 1 is a sectional view of a portion of the cockpit of an airplane, showing the instrument board therein and also the control mechanism in the plane including the control column or wheel which controls the elevators and ailerons and the pedals which control the rudder. This view shows also the tactile units or elements for indicating to the pilot through the sense of touch the various essential factors in flight. This view indicates also the preferred position of the adjusting element for setting or adjusting the mechanism of the tactile instrument which indicates altitude with reference to a predetermined altitude or level and also the preferred position of a similar adjusting device for adjusting the mechanism of the tactile instrument in indicating airspeed with reference to a predetermined speed;

Fig. 2 is a diagrammatic view showing the connections between the tactile indicator elements or "buttons" on the wheel and the various tactile instruments or apparatus for determining airspeed, altitude, and degree of turn, the position of the operator's hands during flight to receive the indications by touch, being shown;

Fig. 3 is a detailed view showing a mechanical form of connection between a moving part attached to a flight factor measuring instrument and the tactile unit or "button" by which the compared reading or indication of the instrument is transmitted to the operator through the sense of touch;

Fig. 4 is a view in elevation, partly in section, of the altitude measuring device taken on the section line 4—4 of Fig. 5, showing the preferred form of mechanism by which the movements of aneroid bellows are transmitted to a movable part, the movement of which has been amplified by means of which altitude as measured with reference to a predetermined altitude, or with reference to sea level, if desired, may be transmitted to the pilot through tactile stimuli;

Fig. 5 is a transverse view in elevation taken on the section line 5—5 of Fig. 4, parts being indicated as broken away to show the detailed construction;

Fig. 6 is a detailed view of a lever and associated elements which operate to control a switch mechanism for opening and closing a circuit to supply current for operating a reversible motor, by which the tactile unit connected to the altitude measuring device is operated;

Fig. 7 is a sectional detailed plan view of the contact points and associated parts taken on the section line 7—7 of Fig. 5;

Fig. 8 is a sectional view in elevation of the altitude measuring device taken on the section line 8—8 of Fig. 9;

Fig. 9 is a cross sectional plan view taken on the section line 9—9 of Fig. 8;

Fig. 10 is a plan view taken on the section line 10—10 of Fig. 8;

Fig. 11 is a cross sectional view of a movable element which is actuated by means of the mechanism of the factor measuring instrument, the said element being directly connected to the tactile unit by means of a Bowden wire or the like, by which the said unit is operated, the said element being shown in retracted position;

Fig. 12 is a detailed sectional view of the element shown in Fig. 11 showing the said element advanced to substantially the extreme upper position;

Fig. 13 is a diagrammatic view, partly in section, showing certain of the main operating elements of the tactile altimeter device together with the relay and electrical circuit by which certain parts of the device are operated;

Fig. 14 is a view in elevation, partly in section, of the tactile indicating air-speed device by means of which air-speed measurements are transmitted to the pilot by means of a tactile unit;

Fig. 15 is a detailed plan view of a modified form of control column (stick) adapted particularly for small aircraft, this view showing an arrangement by which tactile stimuli from factor measuring instruments may be transmitted to the pilot by means of tactile units mounted on the stick in a manner so that it may be grasped with one hand for the transmission of stimuli;

Fig. 16 is a view in elevation of the control column shown in Fig. 15 showing the manner in which the tactile units may be mounted thereon;

Fig. 17 is a diagrammatic view of a form of tactile turn indicator, showing electromagnetic devices or solenoids connected in circuit for causing movement of the tactile units on the wheel as the pointer of the turn indicator moves into contact with the points on the turn indicator to complete the circuit;

Fig. 18 is a detailed cross sectional view taken on the section line 18—18 of Fig. 1, showing the preferred form of electromagnetic unit or solenoid serving to operate the tactile turn indicator units; and Fig. 19 is a detailed sectional view taken on the line 19—19 of Fig. 16 showing the preferred mode of mounting the electromagnets or solenoids within the control column or stick for the operation of the tactile units or "buttons" operatively connected to the tactile turn indicator.

Referring more particularly to Fig. 1 of the drawings, this view indicates the visual instruments of the form usually mounted on the instrument board of a plane, through the indications of which the pilot guides the ship. These instruments include the magnetic compass 2, the altimeter 4, the air-speed indicator 6, the turn indicator 8, the climb indicator 10, a clock or watch 12, the directional gyro compass 14, the bank indicator 16, the horizon instrument 18, a duplicate altimeter 20, the landing beam instrument 22 and the visual beam instrument 24. In this view is indicated also the usual control column 26, on which is mounted the wheel 28, which controls the elevators and ailerons and the foot pedals 30 and 32 which control the rudder.

The parts above referred to are standard construction in connection with which the invention hereinafter described is used and it will be understood that the present invention is not intended to replace the instruments and devices now generally in use except in certain special cases, as hereinafter stated, but is intended to supplement these instruments in such a manner as to make flying safer and easier and to permit blind flying in accordance with the system as hereinafter explained in detail.

Referring more in detail to the drawings, it will be understood that the invention embodies a novel system for the blind flying of airplanes, together with certain novel mechanisms which may be applied to any form of airplane or heavier than air machine, and also in connection with dirigibles, if desired, although it is to be understood that the system as herein described is particularly adapted for use in connection with airplanes of the present commercial forms.

In connection with the invention, which is hereinafter fully described, it is to be understood and contemplated that the various tactile units for receiving the factor registrations or indications from the various factor-measuring instruments, from which the pilot is continuously advised of the conditions of flight, are preferably located in the same relative positions in all airplanes, so that the pilot may know in advance the relative position of the various tactile units and so that he may readily shift from one plane to another without having to "learn" the machine or become familiar with the positions of the tactile units of the various factor measuring instruments.

The operation of my system and the various units involved and mechanism to be employed will be explained in detail in connection with the essential instruments of flight including the tactile altimeter, the tactile speed indicator, and the tactile turn indicator, although it is to be understood that the same or similar mechanism may be employed in connection with factor measurements or tactile indications of other instruments of flight, as may be desired, and I do not consider or desire the invention to be limited to the particular instruments as described, therefore.

Referring more particularly to Fig. 2 of the drawings, it will be apparent how the invention is to be applied in connection with the operation or piloting of aircraft. In applying the invention to the usual form of commercial plane, for example, it will be understood that the various tactile instruments for the operation of the corresponding tactile elements may be located in any suitable position in the plane, preferably forward of the control column; and the tactile units operated thereby are preferably located upon the wheel 28 of the control column 26 so as to be accessible at all times to the fingers or hands of the pilot for the reception of tactile stimuli or factor measurement indications from the factor measuring instruments. By means of the information or indications of the factors of flight received from the various tactile units, the pilot may control and guide the plane without the necessity in general of referring to or reading the various instruments located on the instrument board.

The preferred arrangement of the various tactile units and the corresponding tactile instruments for measuring various essential factors of flight is indicated diagrammatically in this view (Fig. 2) which shows the wheel grasped by the hands of the operator in the usual way the various tactile units being positioned with relation to the wheel so as to be under the fingers and thumbs of the pilot in the normal position of the hands during flight. In this view, the tactile altimeter instrument 100 is indicated as being operatively connected by means of the connection 102 to the tactile unit 104, mounted in relation to the wheel so as to be accessible to the right hand thumb of the operator. Similarly the tactile air-speed indicator 200 is indicated as operatively connected by means of the connection 202 to the tactile unit 204, mounted at the left side of the wheel 28 so as to be accessible to the left hand thumb of the pilot. In order to indicate through tactile means the deviations of the plane from a given direction during flight and also to indicate the degree of turn by means of such tactile units, a tactile turn indicator 300 is provided, which indicator is suitably mounted and connected in circuit with the tactile units 302, 304, 306 and 308 located under the rim of the wheel on the right hand side thereof and with the tactile units 312, 314, 316 and 318 similarly located under the said rim at the left hand side thereof. These turn indicator tactile units or "buttons" are preferably mounted in connection with the wheel so as to be flush with the undersurface of the rim in the inoperative position of the units, the buttons projecting beyond the surface of the rim in the raised or operated positions.

The tactile turn indicator 300 is preferably constructed similar to the ordinary turn indicator and has the contact points 322, 324, 326 and 328 at the right of the middle position of the pointer 310 and has the contact points 312, 314, 316 and 318 at the left of the middle position of the pointer, the various contact points or contact bars being preferably positioned in an arc 320 as in the ordinary turn indicator. The positions of the contact points to the right and left of the center of the dial correspond in general to one, two, three and four width turns, or pointer positions of the turn indicator.

The contact points on the right side of the dial are suitably connected for operation of the corresponding tactile units by means of suitable elements and connections 342, 344, 346 and 348, by which the tactile buttons or units 302, 304, 306 and 308 may be operated. In a similar manner the contact points at the left side of the dial of the turn indicator are operatively connected by suitable elements 352, 354, 356 and 358 by which the corresponding tactile buttons or units 312, 314, 316 and 318 may be operated.

A specific form of construction or embodiment of the invention as applied to a turn indicating device is illustrated and described in detail in connection with Fig. 17 of the drawings, in connection with which the mode of operation of the tactile turn indicator device will be more fully referred to.

It will be apparent that by the use of the simple tactile units mounted in the manner shown, the pilot may guide the plane substantially by the sense of touch in receiving the measured indications of the instruments by which he is informed of each factor independently, although in a coordinated manner, through the movement or positions of the various tactile units or "buttons" with which his fingers or hands are in contact or may contact to receive the tactile stimuli or information as to the corresponding factors of flight.

Referring more in detail to the invention as applied for the determination of elevation by means of the tactile altimeter device or levelometer 100, and transmission to the pilot of measurements thereof by means of tactile stimuli, it will be understood that the operative mechanism of the device is preferably independent of the altimeter of the instrument board as above stated.

In its preferred form, the tactile altimeter device 100 comprises a casing 106 (Fig. 8) which is open to the atmosphere, and within which is mounted the aneroid bellows 108, which is preferably mounted on or connected to the casing 106 by a suitable metallic connection 110 attached to the adjacent side 112 of the said bellows. Connected to the opposite side 114 of the bellows is a post member 116 which is rigidly attached thereto so as to move with the wall 114 of the bellows with changes or fluctuations in pressure on the walls of the unit.

The post member 116 is positioned with relation to a bridge member 118 within the casing so as to pass through an opening 120 therein, the said bridge member being preferably in the form of a Y having the arms 119 and 121, as shown more particularly in Fig. 5 of the drawings. This member 118 serves as a wall or part of an interior or supplementary casing 122, in connection with which the aneroid bellows 108 is mounted, thus forming a rigid construction. The bridge member 118 is preferably held in place by means of two bolts 124 and 126 (see Fig. 5) having the nuts 128 and 130 thereon to secure the arms of the bridge member 118 in place.

The post member 116 is preferably constructed with a shoulder or stop member 132 located thereon so as to be at the left side referring to Fig. 8 of the drawings of the bridge member 118, and with a stop member, as nuts 134 on the other side of the bridge member on the end of the post member. The positions of these stop members are so adjusted as to give the desired limits of movement of the post member 116 on each side of the opening 120.

Connected to the post member 116 is a bar member 136 (Fig. 5) having a knife edge 138 (Fig. 8) thereon, the bar member being preferably held in place on the post member by means of a slot 140 in the post member as shown more particularly in Fig. 5 in cross section. The knife edge 138 of the bar member 136 is adapted to contact with a spring member 142, preferably of the cantilever form, the spring member being mounted on a bar member 144 as an anchorage. The spring member 142 is preferably constructed with two branch members 146 and 148 between which the post 116 is mounted in position so that the knife edge 138 on the bar 136 traverses the opening 150 and bears on the branch members as shown more particularly in Fig. 5, whereby the spring member is deflected to a greater or less extent by movements of the knife edge bar, causing movement around the bar member 144 as a pivot.

The bar member 144 to which the spring member 142 is attached and by means of which the spring member may be rotated or shifted in position to produce a predetermined tension in the spring member, is preferably mounted between blocks or supporting bars 152 and 154 (Fig. 5), being supported between the said block members by means of suitable bearing members, such as set screws 156 and 158, between the ends of which the bar member 144 is pivotally mounted. The bar member is preferably connected to a lever or rod member 160, at the central portion thereof, and is preferably connected to a mechanism by means of which the registering device, or tactile element, may be adjusted for transmitting indications in terms of or related to a predetermined value or setting, whereby altitude may be indicated with relation to the predetermined setting or value. The mechanism by means of which this is accomplished comprises preferably a movable member 162 carrying external screw threads 164 thereon, said external threads being adapted to engage the corresponding internal threads 166 of the movable member 168, the latter member having external threads 170 engaging with corresponding internal threads in a bushing member 172, which bushing member is preferably rigidly connected to the casing by means of set screws 174 and 176. The movable member 168 is preferably operatively connected to a dial member or knob 178 by means of pins 180 and 182, these pins being rigidly connected to the knob member 178 and the movable member 168 having openings 184 and 186 in a flange portion 188 of the movable member 168 so that as the knob 178 is turned the movable member 168 may move inwardly or outwardly relative to the knob. The bushing member 172 preferably carries an external groove 190 which is adapted to be engaged by the end of a set screw 192 carried by the knob member 178 so that as the knob member is turned it is maintained in a fixed position relative to the casing 106. The number of screw threads on the movable rod 162 and on the movable member 168 are so adjusted in ratio as to permit a delicate adjustment of the level adjusting mechanism by the turning of the dial or knob 178. The differential thread combination provides in effect a vernier or micrometer adjustment whereby the apparatus may be set to measure pressures with reference to a predetermined altitude or pressure, as will be hereinafter more fully described.

In order to suitably amplify or magnify the fluctuations or movements of the aneroid bellows which is transmitted to the post member 116 and from thence through the knife edge 138 to the spring member 142, a flexible arm 194 is provided, which arm is preferably supported on and attached to a bar member 196 which is so pivoted with relation to the spring member as to provide a leverage by means of which the movements are suitably multiplied or amplified in ratio to produce the desired sensitivity of the mechanism.

The ends of the bar member 196 preferably contain slots 101 and 103 by means of which the bar member 196 is mounted on spring members 105 and 107, suitable set screws or supporting means being used which engage the spring members in the said slots, thereby providing means for pivoting it and permitting the bar member 196 to rotate or oscillate slightly above its axis on the points of suspension on the spring members.

The spring members 105 and 107 are preferably mounted on suitable block members 109 and 111, being held in place by set screws 123 and 125 (Fig. 5) at the upper end portions thereof and by means of set screws, as 179 at the lower ends thereof, as shown more particularly in Fig. 4 of the drawings. In order to permit oscillation of the bar member 196 and to hold the bar in place on the spring members 105 and 107, suitable set screws 113 and 115 are provided on the undersides of the bar at the slot portions, and set screws, as 163 (Fig. 4) are provided at the upper portions thereof, by means of which the bar member 196 is rigidly attached to the said spring members 105 and 107. In order to suitably vary the tension in the spring members 105 and 107, set screws 175 and 177 (Figs. 4 and 9) are provided which pass through the outer portions of the block members 109 and 111 and engage the inner surfaces of the slots 181 and 183 by which the width of the slot in the block members may be varied somewhat, thereby correspondingly varying the tension in the spring members.

Mounted on the bar member 196 are suitable set screw members 127 and 129, the ends of which come to a point and engage the arms or extensions 146 and 148 respectively of the spring member 142. The said set screws are preferably held in place above the axis of the bar member 196 by means of suitable ears or extensions 131 and 133. It will be noted that the spring member 142 engages the ends 185 of the screws 127 and 129 above the axis of the bar to which the long flexible arm 194 is attached, thus forming a lever of the third class by which movements in the plane at the points of the set screws 127 and 129 will be multiplied at the end of the lever arm 194.

Referring again to Figs. 7 and 8 of the drawings it will be apparent that the arm 194 is mounted between two contact points 135 and 137 of the circuit closing member 161. As shown more particularly in Fig. 7, these contact points are preferably provided on adjustable set screws 187 and 189 which are carried on suitable insulating members 139 and 141 which are held in place by means of bolts 143 and 145 which pass through the arms 147 and 149 respectively, suitable spacing members between the contact points of the circuit closing member being provided, such as insulating blocks 191, 193, 195 and 197. The arms 147 and 149 are suitably supported on the block members 109 and 111 by means of set screws 151 and 153 for example, as indicated in Fig. 5 of the drawings.

On the arm 194 is mounted contact member 198 which is adapted to engage and contact with the points 135 and 137, so as to close a circuit through the leads from the wire 42 to the wire 40 or to the wire 45 as movement of the arm 194 takes place in the proper direction for contact.

In order to operate the tactile unit 104, connected to the tactile altimeter device 100, a motor 38 is connected in circuit with a relay mechanism 36 which is operated when the arm 194 is moved in one direction or the other through movement of the aneroid bellows 108, by which movement contact of the member 198 is made with either the contact point 135 or 137 of the circuit closing member 161 (see Fig. 7). By the operation of the motor 38, the tactile button 155 of the tactile unit 104 is moved in proportion to the rotation of the motor in either direction, whereby the total amount of travel of the said button 155 represents in a quantitative way the elevation or altitude at which the plane is flying. In the preferred form of the invention, the movement of the button 155 is related to the flange 159 of the cylinder portion 157, so that the position of the button indicates the elevation with reference to a predetermined elevation or reference level.

Referring more particularly to Figs. 8, 9 and 10 of the drawings, the motor 38 is preferably supported within the casing 106 on one side of the motor by means of rod members 11 and 11' at the upper portion of the motor casing and by means of rods 13 and 13' at the lower portion of the motor casing. On the other side of the motor, a frame member is employed to support the motor and the mechanism directly connected therewith, which mechanism serves to operate the tactile unit 104, and to actuate the arms 147 and 149 by means of which the circuit closing member 161 is moved out of contacting engagement with the contact member 198 on the arm 194 after the required amount of movement of the arms has taken place corresponding to the position at which the arm 194 has come to rest in indicating a particular altitude.

The supporting frame above referred to comprises the upper rod members 15 and 15' and the lower rod members 17 and 17' together with the cross bars or arms 19, 19', and 71', which support the bosses 27 and 71 (Fig. 9) and the cross bars or arms 21 and 21' which support the boss 33 (Fig. 8).

The boss member 27 serves as a bearing for one end of the motor shaft 29, the other end of the shaft being supported in a bearing within the portion 31 of the motor housing.

The boss member 33 together with a boss member 51 serve as bearings for the shaft member 49, which carries a thread 59 at the middle portion thereof and a worm 81 at its upper portion.

The shaft 29 of the motor 38 carries a worm 53 which meshes with the worm gear 57 mounted on the shaft 49, by means of which the shaft 49 is rotated when the said motor is operated.

In order to operate the piston 117 to which the tactile button or piston 155 of the tactile unit 104 is connected, the screw thread 59 is designed to engage a corresponding internal thread in a boss 61 (Fig. 4) of a movable arm member 63 to which piston member 117 is connected through arms 75 and 77 (Fig. 10). The movable member 63 is preferably prevented from rotation in its movement along the shaft 49 by providing an opening in the boss or enlarged portion 67 of the arm member 63, which engages a rod 69, the rod 69 being fixed to the frame work of the motor in any suitable manner, being preferably secured in a boss 71 as shown more particularly in Figs. 8 and 9 of the drawings. The movable member 63 is guided in its movement so as to move in a vertical direction along the shaft 49. The forward end 73 of the member 63 is preferably connected to rod members 75 and 77 by means of a pivotal connection as shown more particularly in Fig. 8. By the movement of the piston member 117 in the casing portion 79, the button member 155 of the tactile unit 104 is correspondingly operated as has been heretofore explained.

In order to operate the arms 147 and 149 which carry the circuit closing member 161, by the movement of which a circuit is completed to operate the motor 38 when a change in pressure on the aneroid bellows 108 occurs, the worm 81 on the shaft 49 engages a worm gear 83 which is mounted on a rotatable sleeve member 85 carried between the supporting members 87 and 89. In order to prevent longitudinal movement of the sleeve member 85 in the supports, the sleeve member is preferably provided with two grooves, one on each side of the sleeve, the groove in the portion of the sleeve carried by the support 87 being engaged by a set screw 91 and the portion carried by the support 89 being engaged by a set screw 93.

The sleeve member 85 is preferably internally threaded and carries a threaded rod 95 which is adapted to be moved in a forward or return direction depending upon the direction of rotation of the motor 38. The rod 95 is preferably connected to a rod member 97, being pivotally connected thereto by means of the ears of a yoke member 99 as shown in Figs. 8 and 10, the rod 97 being in turn similarly attached to a connection 167, attached to the arms 147 and 149, by means of which the arms are actuated.

The motor 38 is preferably connected in circuit so that it may operate in a forward or reverse direction, depending upon whether the primary circuit, including the battery 44, is completed by the closing of the switch including the contact points 198 and 137, or by the closing of the switch including the contact points 198 and 135 (see Fig. 13).

The operating mechanism for closing the relay switch 37 preferably comprises two cores or field pieces 46 and 48, having the coils 50 and 52 respectively wound on the ends of the cores so as to energize the cores in the same way, so that an armature 54 mounted between the poles of the magnets may be drawn in the direction of either core, depending upon whether the current from the battery 44 passes through the energizing coil 50 or the coil 52.

The armature 54 of the relay 36 is preferably pivoted on a suitable pivot or bearing 56, so as to pivot thereon, and is normally held in neutral position by means of coil springs 58 and 60, mounted so as to bring the armature away from the contact points when the current through the coils of the magnets is broken. On the upper part of the armature 54 is preferably mounted an insulating rod 62 having conductors 64 and 66 positioned thereon so as to contact with contact members 68 and 70 or 72 and 74 respectively so as to close the circuit in one or the other direction through the armature and field winding of the motor 38. In the preferred construction the conductor or contact bar 64 is mounted between the contact members 68 and 72 so as to close a circuit, the particular circuit closed depending upon whether the armature 54 of the relay 36 is moved in a clockwise or counterclockwise direction on the pivot 56. The bar or contact member 66 is similarly mounted on the rod 62 between the conducting members or contact members 70 and 74, so as to close the circuit in one or the other direction simultaneously with the closing of the other circuit when the contact member or bar 64 moves into contact with either of the contact members between which it is mounted.

In the construction shown, the field winding 76 of the motor 38 is connected to the battery 78 by a lead wire 80, being connected to the negative pole of the battery as shown. The lead wire 82 serves to connect the positive pole of the battery with the contact member 64. The contact member 68 is connected by a lead wire 84 to a brush 86 of the motor, the lead wire 88 being connected to the other brush 90 of the motor and to the contact member 70. The contact member 68 is also connected by a lead wire 92 to the contact member 74. Similarly the contact member 70 is connected by a lead wire 94 to the contact member 72. The circuit is completed through the field winding 76 of the motor by the lead wire 96 which connects the other terminal of the field winding with the contact member 66 mounted on the insulating rod 62 as previously described. The battery 44 is connected to the contact point 198 of the movable arm or member 194 by means of a lead wire 42, being connected with the positive pole of the battery 44 as shown. The negative pole of the battery is connected by a lead wire 98 to a relay coil 39 which is mounted on and passes around the armature 54. The coil 39 is connected to the coil 52 by means of a lead wire 41 and is also connected to the coil 50 by means of a lead wire 43. The relay coil 52 is directly connected to the terminal contact member 135 by means of a lead wire 40 and, correspondingly, the relay coil 50 is connected to the terminal or contact member 137 by means of a lead wire 45.

The operation of the relay mechanism is as follows:

When the arm 194 is moved so that the contact point 198 engages the contact point 137, thus closing the circuit from the lead wire 42 to the lead wire 45, a current from the battery 44 passes through the lead wire 42 to the contact point 198 and from thence to contact point 137 and through lead wire 45 to the coil 50 and through lead wire 43 to the coil 39 and from thence by the lead wire 98 to the negative pole of the battery 44. The current in passing through the coil 50 energizes the magnet 46, and similarly the current through the coil 39 energizes the armature 54 whereby the armature moves in a counterclockwise direction around the pivot 56 so as to cause contact between the armature 54 and the end of the core or field piece 46. In this position of the armature 54, the member 64 engages the member 68 and the member 66 engages the member 70, thus closing the circuit between these members so that current flows from the battery 78 through the lead 82 to the contact member 64 and from thence to the contact member 68 and through the lead wire 84 to the brush member 86 and through the armature 47 of the motor 38 to the brush member 90 and from thence through the lead wire 88 to the contact member 70, then to the contact member 66 and from thence through the lead wire 96 to the field coil 76 of the motor and then through the lead wire 80 back to the negative terminal of the battery 78. The current from the battery 78 thus causes the motor 38 to rotate in one direction, as a clockwise direction for example, whereby the arms 147 and 149, are actuated through the gear train, as has been explained in connection with Fig. 3 of the drawings, in a direction tending to bring the arm 194 away from the contact member closing the primary circuit through the battery 44. With the contacts as assumed, the arms 147 and 149 are moved in a direction to open the circuit at the contact points 198 and 137 and as soon as the circuit is broken through the contact points, the current through the coils 50 and 39 is interrupted, whereby the corresponding magnets are de-energized and the spring member 58 then returns the armature 54 to its central or neutral position, in which it is then held, through the equal tension of the springs 58 and 60. The movement of the armature 54 away from the magnet 46 breaks the contact also between the members 66 and 70, which interrupts the current flowing from the battery 78 to the motor 38, whereby the motor is stopped.

When the arm 194 is moved so that the contact point 198 engages the contact point 135, current from the battery 44 passes through the lead wire 42 to the contact point 198 and from thence to the contact point 135 and through the lead wire 40 to the coil 52 and from thence through the lead wire 41 to the coil 39 and from thence through the lead wire 98 to the negative terminal of the battery 44. The current through the coils 52 and 39 energizes the field piece 48 and the armature 54, causing the armature to move to the right into contact with the field piece 48. As the armature 54 moves to the right, or in a clockwise direction, the member 64 contacts with the member 72 and the member 66 contacts with the member 74 closing the circuit in which these contact members are located, whereby current from the battery 78 passes through the lead wire 82 to the contact member 64 and from thence to the contact member 72, then through the lead wire 94 to the lead wire 88, then to the brush 90 and through the armature 47 of the motor to the brush 86, and from thence through the lead wire 84 to the lead wire 92, then to the contact member 74 and from thence to the contact member 66, then by the lead wire 96 to the field winding 76 and from thence through the lead wire 80 to the negative terminal of the battery 78.

This causes the motor 38 to rotate in the opposite or counterclockwise direction, causing the arms 147 and 149 to be actuated, by means of the levers and intermediate gearing, in a direction so as to move the contact member 135 away from the contact member 198, thus opening the circuit through the battery 44 and interrupting the current to the relay coils 52 and 39, whereby the corresponding magnets are de-energized. As the magnets 48 and 54 are demagnetized, the spring 60 moves the armature 54 into its central position, by which the contact members 64 and 72 and also the members 66 and 74 are separated, thus interrupting the current from the battery 78 to the motor 38.

As soon as the motor 38 stops it remains stationary or dead until movement of the bellows 108 in either direction causes the arm 194 to move so as to close the circuit between the contact points 198 and 137, or the contact points 198 and 135, whereby the motor is again placed in circuit with the battery 78 repeating the operation as above described.

As the motor 38 operates in one direction or the other, the movable part 117 which is directly connected to the tactile button or piston 155 will be correspondingly operated, the said button being actuated by means of a Bowden wire or other suitable connection 102 as indicated more particularly in Figs. 2 and 3 of the drawings.

It will be understood that the arm 194 is sufficiently flexible so that as movement of the arms 147 and 149 causes contact between the adjacent contact points with greater or less pressure, the arm 194 may be bent to a greater or less extent without interfering with the operation of the mechanism.

It will be understood also that as the pressure on the aneroid bellows 108 increases, the post member 116 will move to the left, referring to Fig. 8, thus moving the knife edge 138 to the left, that is, in the same direction, and flexing the spring member 142 toward the left, by which the pressure on the points 185 of the screw members 127 and 129 is decreased, whereby the arm 194 moves to the left, or in a counterclockwise direction. It will be apparent, on the other hand, that as the pressure on the aneroid bellows 108 decreases, the movement of the parts takes place in the opposite direction, that is, to the right, whereby the arm member 194 is rotated in a clockwise direction.

Referring again to Fig. 8 of the drawings, as the arm 194 moves toward the right, or in a clockwise direction corresponding to a decrease in pressure on the aneroid bellows, the contact point 198 of the arm 194 moves into contact with the contact member 135, whereby a circuit from the lead wire 42 to the lead wire 40 is closed, by which the relay mechanism 36 is operated, causing the switch mechanism 37 to close, whereby the motor 38 is operated in a clockwise direction, for example.

It will be obvious that by making contact between the contact point 198 on the arm 194 and the point 137 of the circuit closing member 161, which takes place through the movement of the arm 194 to the left, referring to Fig. 13, which corresponds to an increase in pressure on the aneroid bellows 108, the circuit from the lead wire 42 to the lead wire 45 is closed, whereby the motor will be actuated in a counterclockwise direction, for example.

The circuit which is closed by the movement of the arm 194 into contact with the contact points 135 or 137 is preferably a 2-volt circuit, whereas the circuit which is closed through the operation of the switch mechanism 37 to operate the motor 38 is preferably a 12-volt circuit.

It will be understood from the above description, that the motor 38 serves the dual function of controlling (1) the movement of the piston 117, by which the tactile element 104 is operated, and (2) of controlling the movement of the arms 147 and 149 on which the circuit closing member 161 is mounted, thereby breaking contact between the circuit making contact points 198 and 137 on the one hand, and 198 and 135 on the other hand, when either of the sets of contact points are in engagement. When the motor is actuated to operate the arms connected to the member 161, by which contact of the points is broken, the current to the motor is interrupted through the breaking of the circuit and the motor is stopped.

It will be clear, therefore, that when the plane is flying at the desired level or altitude in accordance with the set of the dial member 178 of the level regulator 35, the contact point 198 is in its mid position between the contact points 135 and 137, and the tactile element 155 will be flush with the upper flange 159 of the tactile unit 104. When the plane is flying at a different level from the predetermined level, on the other hand, the arm member 194 will be swung in a direction to make contact between the contact member 198 and one of the contact members 135 or 137, whereby the motor will again be put in operation, as above explained, transmitting to the pilot through the tactile unit the information or indication as to the altitude of the plane, whereby the altitude of the aircraft may be corrected to correspond with the predetermined altitude for which the regulator 35 is set.

It will be apparent also from the drawings and the above description that the position of the set screws 127 and 129 may be regulated for contact with the arms 146 and 148 of the spring member 142, so that at a pressure corresponding to the pressure at an altitude of 20,000 feet above sea level, for example, the arms 146 and 148 just touch or contact with the ends of the set screw members 127 and 129 when the arm 194 is in its mid-position.

The total range of movement, or arc, through which the arms 147 and 149 may be moved is determined by the distance between the shoulder 132 and the nuts 134 on the post member 116, these parts coacting with the bridge member 118 which definitely limits the arc of travel of the arm 194.

The knob member 178 is, as above described, connected to the device for setting the reference level of the tactile altimeter instrument for any desired altitude as a reference level. The limit or maximum range of the instrument may obviously be determined by the conditions under which the plane is to be operated, although for ordinary commercial flying the maximum range is preferably adjusted for about 18,000 to 20,000 feet altitude. The screw threads of the adjusting device are preferably designed so that as the screw member 168 is screwed in clockwise direction, into the bushing 172, it travels to the right at a rate of 24 threads per inch with respect to the bushing member 172, but at the same time it screws also to the right on the screw member 162 at the rate of 32 threads per inch, so that the resultant movement of the screw member 162 is a movement to the right, corresponding to 8 threads which is the equivalent of a motion imparted to a screw member having 96 threads to the inch.

This differential thread combination corresponds to a vernier adjustment and gives a very sensitive or micrometer adjustment to the operative screw member 162 by means of which a predetermined tension is imparted to the spring member 142 corresponding to the desired altitude. It will be apparent that when the screw member 162 is moved to the right, referring to Fig. 8 of the drawings, the arm 160 is rotated correspondingly around the bar member 144 on the pivots 156 and 158 (Fig. 10) by which a corresponding clockwise direction is imparted to the bar member 144 which releases tension to a corresponding extent on the spring member 142. It will be clear that when the knob member 178 is turned in the opposite direction, the bar member is rotated slightly in a counterclockwise direction whereby the tension in the spring member 142 is proportionately increased.

It will be understood that by means of this adjustment, it is possible to reduce the tension in the spring member 142 by a predetermined amount, or in other words to unload the pressure on the spring member corresponding to the reduction in pressure in ascending to any given altitude, which corresponds to a movement of the aneroid bellows 108 and the post member 116 to the right producing a decreased pressure of the points 185 of the set screws 127 and 129 on the arms 146 and 148 of the spring member 142. It will be clear, therefore, that as the dial 178 is moved so as to reduce the tension on the spring member 142, the bar member 144 will be rotated in a clockwise direction, whereby the tension in the spring 142 will be reduced; as a result of this reduction in tension the set screws 127 and 129 on the bar member 196 will be moved to the left, or in a counterclockwise direction, about the axis of the bar 196 on the spring members 105 and 107, by which the arm 194 will be moved in a counterclockwise direction, whereby the circuit will be closed through the contacts 198 and 137 to operate the motor 38 and whereby the piston 117 and the corresponding tactile unit 104 will be operated so that the button 155 of the tactile unit will be moved into a position below the flange member 159 to indicate the relative distance or altitude below the pre-determined desired altitude for which the dial 178 is set.

It will be obvious that as the plane gradually rises to the predetermined altitude, the element 155 of the tactile unit rises correspondingly, so that when the predetermined level is reached for which the dial 178 is set, the button 155 will be flush with the flange 159 indicating that the plane is flying at the predetermined altitude. If the plane rises above or below the predetermined level during flight the element 155 will be raised or lowered accordingly so that the pilot is continuously informed of the altitude of the plane through the tactile unit without the necessity of reading the altimeter on the instrument board.

It will be understood that while the form of tactile altimeter device, as described, represents the preferred form of the invention, various changes or modifications may be made without departing from the principle of the invention, as will be apparent to those skilled in the art. While the use of a separate tactile altimeter instrument connected to the corresponding tactile unit as above described is preferred, it will be understood that in connection with the two altimeters which are usually employed on the instrument board, one of the altimeters might be attached to and operated in connection with the tactile unit 104 as described more particularly in connection with Figs. 4 to 13 inclusive of the drawings, without danger due to instrument failure. By the use of two such altimeter instruments, one for visual reading and the other for combined visual and tactile indications, the factor of safety in connection with these instruments is at least equal to that obtained by the use of two visual instruments in the manner now generally used.

Referring now to the tactile air-speed mechanism as indicated in Fig. 2 of the drawings, and more particularly shown in Fig. 14, the device 200 illustrated is an air-speed device for determining the speed of aircraft, the speed indications being transmitted to the operator through tactile stimuli by means of the tactile unit 204 operated by means of a Bowden wire or the like member 202 in substantially the same manner as described in connection with the altimeter unit.

The dynamic pressure tube 206 and the static pressure tube 207, through which air pressure is transmitted to the aneroid bellows 208 of the speed indicator, are preferably mounted on the wings of the plane in the usual manner, the dynamic pressure tube 206 communicating with the interior of the aneroid bellows 208 and the static tube 207 communicating with the chamber 210 on the outside of the bellows.

The operating elements of the air-speed device are mounted within a suitable casing 212 in substantially the same manner as has been described in connection with the tactile altimeter mechanism, except as to further details of construction to which reference will be specifically made. The pressure developed on the wall 209 of the aneroid bellows 208 is a differential pressure and represents the difference in pressure developed by the kinetic energy of the air exerted on the column of air in the dynamic tube 206 and the static air pressure transferred to the chamber 210 through the static tube 207.

It will be understood that the differential pressure on the wall 209 of the bellows unit is created through the speed or movement of the plane in such a manner that as the air-speed increases, the pressure on the wall of the bellows unit increases proportionately and moves to the right with reference to Fig. 14 of the drawings, against the resistance of a spring unit, as 282, which may be mounted so as to directly contact with the arm 294 of the amplifying means. A similar spring member 281 is preferably mounted between the wall 209 of the bellows unit and a projection 295 on the arm 294 by means of which movements of the wall 209 are transmitted to the arm 294 in a manner somewhat similar to that in which movements of the aneroid bellows 108 is transmitted to the arm 194 in the tactile altimeter device.

In the tactile air-speed measuring device the pivoted arm 294 is preferably similar to the arm 194 of the altimeter device, which arm serves to magnify or amplify the movements of the wall 209 of the aneroid bellows 208, the arm being mounted between the contact points 235 and 237 of a circuit closing member 261 attached to arms such as 249, as has been fully explained in connection with the tactile altimeter device. It will be understood that the relay device 236 and the motor 238 are in circuit in the same manner as has been described more particularly in connection with Fig. 13 of the drawings.

In the embodiment of the invention as illustrated in Fig. 14 of the drawings, it will be noted that the tactile unit 204 is shown directly connected to the rods 275 which is operated in turn by means of the movable member 263 carried on the threaded portion 259 of the shaft 262 similar to the shaft 49 shown in Fig. 8 of the drawings. The tactile unit 204 is preferably mounted so as to move in a forward and return direction in a cylindrical portion 276 of the casing 212, the flange member 280 serving as a reference level in determining the speed indication through the sense of touch. The portion 276 of the casing has preferably an enlarged part 279 which may be provided with packing 278 to permit longitudinal movement of the tactile element and to hold the element laterally in position.

It will be understood from the above description that as the speed of the plane decreases the spring member 282 will force the arm 294 to the left against the spring member 281 which moves to the left on the wall 209 of the bellows due to the decrease in pressure thereon. It will be understood that as the arm 294 moves to the left a circuit is completed through the contact members 298 and 237 causing operation of the relay mechanism 236 and of the motor 238 in the manner explained in connection with Fig. 13 of the drawings. By the operation of the motor 238, the movable member 263 and the rods 275 will be operated causing corresponding movement of the tactile element 204.

The tactile air-speed mechanism is preferably mounted in a position in the plane so that the rod member 275 may move in substantially a vertical direction so as to directly operate the button or unit 204 on the wheel or stick in a position accessible to the hands of the pilot. It will be understood, however, that instead of the direct connection, as illustrated in Fig. 14 of the drawings, a Bowden wire connection 202 or suitable hydraulic connection may be employed for transmitting movements from the piston or rod members 275 to the tactile unit 204.

In connection with the tactile element 204, I may employ a suitable form of device by means of which the position of the tactile element 204 may be determined through the sense of touch so as to obtain the actual speed indication. I may, for example, provide a groove member in the top portion of the casing 276, the groove being provided with reference notches so that the pilot may, through the sense of touch, determine the position of the unit 204 with reference to the notches. For this purpose a series of main notches may be provided which represent digits and a series of intermediate notches or reference lines may be provided which represent intermediate units of speed.

It will be understood also that the speed relative to a predetermined or desired speed may also be determined by substantially the same manner as provided in connection with the tactile altimeter unit. For this purpose I may provide a dial or speed regulating unit 55, the position of which is indicated in Fig. 1 of the drawings, by means of which readings of the tactile unit 204 will be referred to the flange 280 to indicate whether or not the actual speed is greater or less than the predetermined desired speed of the plane for which the regulator 55 has been set. The manner in which this may be accomplished and the mechanism required will be clear to those skilled in the art by reference to Figs. 4 to 10 of the drawings together with the corresponding description and need not therefore be repeated in detail.

It will be apparent that many modifications in the form of speed device may be made. I may, for example, employ a simplified construction in which a piston is subjected to the dynamic pressure of the air during flight, the device being open to the atmosphere on the opposite side of the piston and subjected to spring pressure so that the movement of the piston is substantially proportional to the differential pressure between the dynamic and static air pressure. The piston may be connected to a coil spring for example, as a weighing device, the piston being operatively connected to a tactile unit by means of which the relative speed of the plane may be determined through the sense of touch. Another simplified construction suitable for relative speed measurements comprises an indicator of the anemometer type in which four cups, subjected to the dynamic pressure of the air, revolve horizontally, turning a vertical shaft and operating a governor at the top end. In this instrument, the lower piston of the tactile unit is connected to the top side of the governor and as variations in speed occur the expansion or contraction of the governor actuates the tactile unit by which the relative speed of the plane may be determined through the sense of touch.

It will also be understood that in place of the form of tactile speed indicator, as above described, I may, if desired, employ the form of mechanism shown and described in connection with the altimeter unit 100, which mechanism may be connected to the aneroid bellows 208 of the speed indicating device by using a spring as 142 and connected parts in exactly the same way as the associated mechanism of the altimeter device is connected to the aneroid bellows thereof.

While the various forms of tactile stimuli transmitting devices, as described, contemplate the use of a Bowden wire as a means of transmitting movement from a primary mechanism for measuring a particular factor in flight to a tactile unit by which the measurement is indicated, it will be understood that the transmission to the tactile unit may be made by other suitable means.

A hydraulic system may be employed, for example, for transmitting movement from the original measuring device to the tactile units or buttons. The tactile units may be operated, for example, through the medium of castor oil maintained in a metal hose or tube connected to the part of the mechanism in which the movement of the aneroid bellows has been suitably amplified. It will be obvious that castor oil, for example, has the advantage of a low freezing point and high boiling point and that the viscosity of this oil remains substantially constant through such a range of temperature as would ordinarily be encountered in connection with commercial flying. This oil has furthermore a low coefficient of expansion; and in transmitting movement to the tactile unit, the amount of deviation or change due to expansion or contraction within the ordinary range of temperatures would be entirely negligible. It will be understood, however, that some other fluid might be employed, such, for example, as mercury, alcohol, or other liquids having the desired properties to meet particular conditions which may be encountered in flight; or other means by which indications or tactile stimuli may be transmitted to the operator may be used, as will be apparent to those skilled in the art.

The preferred form of tactile turn indicator, or device for indicating deviations from the line of flight, as indicated more or less diagrammatically in Figs. 2 and 17 of the drawings, by which the measurement or indication of the degree of turn during flight is transmitted to the pilot by means of movement of the movable elements of the tactile units, or by other tactile stimuli; by this means also the pilot is informed of deviations of the plane or aircraft from the set course.

The numeral 300 designates a turn indicator of the usual form having a pointer 310 which travels over an arc 320 having a series of contact points 322, 324, 326 and 328 to the right of the middle position of the pointer and contact points 332, 334, 336 and 338 to the left of the neutral or middle position of the pointer. These contact points are each connected with corresponding "buttons" or tactile elements 302, 304, 306, 308 and 312, 314, 316, 318 which are preferably located in such a position on the control column or stick as to be within reach of the fingers of the pilot, as for example on the under surface of the wheel 28.

The contact points 322, 324, 326 and 328 at the right on the turn indicator are connected through lead wires 342, 344, 346 and 348, to the corresponding tactile units 302, 304, 306 and 308. In a similar way the contact points 332, 334, 336 and 338 to the left of the pointer in the turn indicator are connected by means of wires 332, 334, 336 and 338 to corresponding tactile units 312, 314, 316 and 318.

The contact points of the turn indicator are preferably connected with a source of current such as a battery 360 which is in circuit with a series of solenoids 362, 364, 366, 368 and 372, 374, 376 and 378, so that when contact is made between the pointer 310 and any of the contact points to the right or left of its neutral position, the corresponding tactile unit or units will be operated by the solenoid or solenoids which are actuated, thus indicating to the pilot the degree of turn or the extent of deviation which is being made from the course.

Referring more particularly to Fig. 17 of the drawings, the battery 360 is shown as connected in circuit with the pointer 310 of the turn indicator 300 by means of a lead wire 370, the opposite pole of the battery being connected in circuit through the lead wire 380 with the two series of solenoids above referred to, the lead wire 380 being connected through the lead wires 382, 384, 386 and 388 to the solenoids on the right of the wheel 28 and by lead wires 392, 394, 396 and 398 to the solenoids on the left of the wheel 28. It will be understood that the circuit from the battery through the solenoids 362, 364, 366 and 368 on the right of the wheel 28 is completed by means of the lead wires 342, 344, 346 and 348 when the pointer 310 contacts with one of the corresponding contact points on the right of the turn indicator and correspondingly the circuit through solenoids 372, 374, 376 and 378 is completed through the lead wires 352, 354, 356 and 358 when the pointer engages one of the corresponding contact points on the left of the turn indicator.

It will be understood that the contact bars or contact points of the turn indicator are preferably positioned in such a manner that deviations of the plane up to two degrees from the intended course will not produce actuation of the tactile units of the turn indicator device, whereby when the course is maintained within an accuracy of a two degree deviation, the pilot receives no warning signal or movement of the tactile units of the turn indicator.

The following table indicates the preferred arrangement in connection with the contact bars of the turn indicator and the preferred mode of operation of the tactile units in indicating the degree of turn or deviation:

| Degree of turn | Indication on tactile units |
|---|---|
| Less than two degrees. | No units raised. |
| Two degrees. | Contact bar 322 or 332 is in circuit and one button is raised. |
| One width turn to right or left, in which contact bars 322 and 324, or 332 and 334 are in circuit. | The first and second buttons, 302 and 304, or 312 and 314 are in raised position. |
| Two width turn, in which pointer 310 is in contact with bars 324 and 326, or with 334 and 336. | Second and third buttons are raised; that is, buttons 304 and 306 or 314 and 316 are in raised position. |
| Three width turn, in which the pointer 310 engages bars 326 and 328 or 336 and 338. | The third and fourth buttons are raised, that is buttons 306 and 308 or 316 and 318 are in raised position. |
| More than a three width turn. | Only the fourth button is raised, that is button 308 or 318 is in raised position. |

It will be understood that in the above table the terms "one width turn", "two width turn", etc., refer to the degree of turn of the plane, corresponding to one, two, etc., widths of the pointer 310 in the turn indicator. A one width turn, for example, means a turn in which the pointer is displaced one width from the middle position and corresponds, in general, to the making of a turn of 180° in about one minute. It will be understood, however, that the degree of turn may vary to some extent depending upon the type of turn indicator used and also upon its adjustment.

It will be noted particularly in connection with Fig. 17 of the drawings that the width of the contact bars may vary somewhat and that the spacing of the bars may also be varied somewhat by the insertion of varying widths of insulating material between the bars. It will be apparent, however, that it is desirable to have the end contact bars, or the bars at the extreme ends of the scale, of greater width than the other bars, so that when the plane is making a maximum degree turn, the fourth buttons, that is buttons 308 or 318, will remain in the raised position so as to give the desired warning to the pilot in the making of the turn.

As indicated in Fig. 2 of the drawings, the preferred position of the tactile units of the turn indicator is on the underside of the wheel 28 in such a position that the fingers of the pilot would naturally fall on the buttons when the thumbs are in contact with the tactile unit 204 of the air-speed device 200 and the tactile unit 104 of the levelometer or altimeter 100 in the relative positions as indicated.

Referring more in detail to Fig. 18 of the drawings, it will be seen that the "buttons" or tactile elements, as 302, which are mounted on the under surface of the wheel 28 are substantially flush with the curved surface of the wheel in the retracted position of the solenoids.

The construction of the solenoids and the manner in which the solenoids may be mounted within the wheel will be apparent from a consideration of Figs. 1, 2, 17 and 18. The wheel 28 preferably contains an interior chamber 473 which communicates with the under surface of the wheel by means of openings 475 in which the buttons, as 302, are mounted. The solenoids comprise the usual coil 477 which is mounted within the tubular core 479 of the electro-magnet. A plunger 448 of the electro-magnet is mounted within a non-magnetic sleeve 450, which in turn is mounted within the tubular core 479 which is of magnetic material. Attached to the plunger 448 is the armature 454 which when a current is passed through the coil is drawn or sucked up by the magnetic field into contact with the ends of the sleeve 450 which acts as a stop, whereby the button 302, mounted on the end of the plunger 448, is brought into its raised position. In order to raise or return the plunger 448 to its initial position after the current through the coil of the solenoid is interrupted, I preferably employ two spring members 456 and 458 which are of the leaf type and mounted on one end of the core 479, as shown more particularly in Fig. 18 of the drawings.

It will be understood that the various electromagnets within the wheel are similar and the construction may be varied somewhat if desired, as may be found necessary in connection with specific installations in which the said invention is to be employed.

Referring more particularly to Figs. 15, 16 and 19 of the drawings, it will be apparent that in connection with the tactile turn indicator device as applied to the "stick" or control column 568, the solenoids 570, 572, etc., are in circuit in the same manner as indicated in Fig. 17, except that the solenoids are mounted within the stick 568 instead of in the wheel 28.

It will be apparent also that the solenoid members are preferably mounted on the forward side of the stick in parallel relation, so that the hand of the operator may pass over all of the buttons or tactile units at one time so as to feel when anyone or more of the buttons project into the raised position.

Referring particularly to Fig. 19 of the drawings it will be apparent that the solenoid 570 is shown in the raised position so that the button 574 projects outwardly from the surface 569 of the stick, whereas the solenoid 572 is shown in the retracted position in which the button 576 is flush with the exterior surface 569 of the stick. These solenoids are preferably constructed in the same manner as described more particularly in connection with Fig. 18 of the drawings.

It is to be understood in connection with the turn indicator as above described that I preferably employ a standard commercial form of indicator the details of which need not be herein described. It is apparent, however, that by modifying this commercial form in the manner indicated in Figs. 2 and 17 of the drawings, the tactile stimuli or turn measurement indications may be brought to the fingers of the pilot in the manner indicated.

It is to be understood, also that in place of the tactile unit raising system, by which the tactile elements are raised by means of solenoids, I may employ a vibratory system in connection with the tactile elements of the turn indicator, by which, as the circuit is completed either to the right or the left of the neutral position in the first, second, third or fourth degree of turn, the corresponding tactile elements will be vibrated by means of electromagnets to which a make and break system is connected.

While the operation of the tactile elements connected to the tactile altimeter instrument and the tactile speed indicating device has been described as depending upon mechanical or hydraulic transmission from the corresponding instrument, it will be obvious that the tactile units may, if desired, be operated through an electrical system by the opening or closing of a circuit, by the making of contacts with a series of contact points, in the same manner as has been explained in connection with the turn indicator. In this manner either a series of buttons may be operated or a single piston or button may be made to operate by raising or lowering in proportion to the altitude, speed or other factor as will be obvious from the above disclosure.

It will be understood, therefore, that although the tactile system described, in which the buttons or units are raised proportionately to one of the factors, as is employed in connection with the speed indicator and the altimeter device, or merely raised in position, as has been described in connection with the units of the turn indicator system is preferably employed, it will be understood that vibratory indications might readily be adapted to produce the various tactile stimuli by which the information as to quantitative measurement indications of various other factors of flight might be transmitted to the pilot.

While the preferred positions of the tactile units with relation to the wheel of the control element for larger commercial aircraft is that as shown in Fig. 2 of the drawings, and the preferred arrangement of the tactile units in smaller aircraft is on the stick, as has been illustrated in connection with Figs. 15 and 16 of the drawings, it will be obvious that the positions of these elements may be varied if desired in some instances or installations, although as above stated a uniform arrangement of the tactile elements in planes of the same type is particularly desirable.

It is contemplated, for example, that the tactile unit of the tactile altimeter device may be located on the upper end of the stick and the tactile units of the turn indicator may be distributed between the stick and a supplemental fixture mounted on the fuselage at the left of the pilot, to which also the tactile unit for the speed indicating device may be attached. The four buttons, for example, which correspond to the contact points on the right of the arc of the turn indicator may be located on the stick in the same relative position as shown in connection with Fig. 16 of the drawings and the other buttons may be located on a similar stick or dummy member mounted on the fuselage in a position readily accessible to the left hand of the pilot.

The tactile unit of the speed indicating device may also be located, if desired, on the side of the dummy stick in a position so that as the tactile element moves in its cylinder in which a groove is located, the groove being preferably positioned so as to be accessible to the left thumb of the pilot by means of which he may determine the variations in speed by moving the thumb along the groove to feel the position of the tactile element with relation to the reference marks as above described.

It will be understood also that while the system of operation and control of aircraft has been explained in connection with devices for transmitting tactile stimuli in connection with the altimeter, air-speed device and turn indicator, it may readily be applied in substantially the same manner to other instruments without substantial deviation from the principle as described in connection with the aforementioned instruments. The device may be applied, for example, to the bank indicator 16 by means of a series of conductors mounted on each side of the indicator device which completes a circuit when the ball of mercury in the indicator bridges two of the contact points. The electrical circuit may then be made to operate one or more tactile units in much the same manner as is described in connection with the tactile turn indicator, as will be obvious from the description and illustration in that form of the invention, and requires no further description therefore.

It will be understood also that the method of transferring information as to the flight factors as above explained may be applied to the visual beam, used as a course indicator or when used as a landing beam instrument, or to the radio compass instruments.

It will be understood furthermore that, if desired, one or more of the instruments on the instrument board may be connected to a tactile unit or tactile units under the hands of the operator so that only one instrument need be used for receiving both the tactile indications and the visual reading of the instrument. For example, the turn indicator on the instrument board may be connected up in circuit in the manner as above explained in connection with Fig. 17 of the drawings so that a visual reading may be obtained if desired in addition to the tactile indications of the same instrument. This is possible particularly in view of the fact that the gyro compass and magnetic compass give independently the directional factor and in case of failure of the turn indicating mechanism, the result would not be serious.

It will be understood, therefore, that while the invention and various forms of devices herein described have been illustrated in their preferred form, various changes or modifications might be made by those skilled in the art without departing from the spirit or scope of the invention as defined in the claims annexed hereto.

Having thus described my invention, what I claim as new is:

1. A device for transmitting flight factor information from a flight factor measuring instrument to the pilot of an aircraft through the tactile sense of his hand without the necessity of making a visual reading of such flight instrument which comprises a quantitative flight factor measuring device, a control element operated by the pilot during flight to control the flight of the aircraft, a tactile unit for indicating said quantitative measurement mounted on the control element so as to be accessible to a hand of the pilot in the normal flying position and means operatively controlled by said factor measuring device for transmitting the quantitative flight factor measurement from the said measuring device to the said tactile unit.

2. A device for transmitting flight factor information from a flight factor measuring instrument to the pilot of an aircraft through the tactile sense of his hand without the necessity of making a visual reading of such flight instrument which comprises a quantitative flight factor measuring device, a control element operated by the pilot during flight to control the flight of the aircraft, a tactile unit having a movable element for indicating measurements of said measuring device in terms of deviations, said tactile unit being mounted on the control element so as to be accessible to a hand of the pilot in the normal flying position and means operably controlled by said factor measuring device for transmitting the quantitative flight factor measurement indication from the said measuring device to said movable element, so as to indicate the amount of deviation from the desired factor to be maintained.

3. A device for transmitting flight factor information from a flight factor measuring instrument to the pilot of an aircraft through the tactile sense of his hand without the necessity of making a visual reading of such flight instrument which comprises a quantitative flight factor measuring device having means for measuring a flight factor from zero and from another predetermined base factor, a control element operated by the pilot during flight to control the flight of the aircraft, a tactile unit having a stationary part and a movable element for indicating measurements of said measuring device in terms of deviations from zero and from said other predetermined base factor, said tactile unit being mounted on the control element so as to be accessible to a hand of the pilot in the normal flying position and means operably controlled by said factor measuring device for transmitting the quantitative flight factor measurement indication from the said measuring device to the said tactile unit from zero or in terms of the amount of deviation from said predetermined base factor.

4. A device for transmitting flight factor information from a flight factor measuring instrument to the pilot of an aircraft through the tactile sense of his hand without the necessity of making a visual reading of such flight instrument which comprises a quantitative flight factor measuring device having means for measuring differences from a predetermined desired base factor measurement, a control element operated by the pilot during flight to control the flight of the aircraft, a tactile unit for indicating the differential between the actual factor measurement and the predetermined desired factor measurement, means for mounting the said tactile unit on said control element so as to be accessible to a hand of a pilot in the normal flying position and a connection from said measuring device to said tactile unit operably controlled by said factor measuring device for transmitting the differential quantitative flight factor measurement from the said measuring device to the said tactile unit.

5. A device for transmitting flight factor information from flight factor measuring instruments to the pilot of an aircraft through the tactile sense of his hand without the necessity of making visual readings of such flight instruments which comprises a series of quantitative flight factor measuring instruments, a control element operated by the pilot during flight to control the flight of the aircraft, a series of tactile units each having a stationary part and a movable part and means for setting the unit to indicate deviations from a predetermined base factor measurement, said tactile units being mounted on the control element so as to be accessible to a hand of the pilot in the normal flying position and means operably controlled by said factor measuring instruments for transmitting the quantitative flight factor measurement indications from each of said measuring devices to the corresponding tactile unit in terms of deviations from the said base factor measurement.

6. A device for transmitting flight factor information from flight factor measuring instruments to the pilot of an aircraft through the tactile sense of his hands without the necessity of making a visual reading of such flight instruments which comprises a plurality of quantitative flight factor measuring devices, a control element operated by the pilot during flight to control the flight of the aircraft, a plurality of tactile units each of which is operatively connected to one of said measuring devices and each of which units is provided with means for indicating deviations from a predetermined base factor including a stationary part and a movable element, said tactile units being mounted on the control element of the aircraft so as to be substantially under the hands of the pilot in the normal flying position and connecting means operably controlled by said factor measuring devices for simultaneously transmitting the quantitative flight factor measurements from each of said measuring devices to the corresponding tactile unit to indicate in coordinated form the deviations from the predetermined base factors for which the units are set.

7. A device for transmitting flight factor information from flight factor measuring instruments to the pilot of an aircraft through the tactile sense of his hands without the necessity of making visual readings of such flight instruments which comprises the usual instruments for visual reading on the instrument board including the altitude measuring and speedometer, a separate altimeter device and a separate speed measuring device, means connected to at least one of said measuring devices for referring the measurement indication thereof to a predetermined desired measurement and means in connection therewith for adjusting the reference measurement indication to the desired value to be maintained, a control element operated by the pilot during flight to control the flight of the aircraft, a tactile unit connected to each of said measuring devices for indicating said quantitative measurements, means for mounting the said units on the control element of the aircraft so as to be accessible to the hands of the pilot in the normal flying position and connecting means operably controlled by said measuring devices for transmitting the quantitative flight factor measurement indications from each of said measuring devices to the corresponding tactile unit.

8. A device for transmitting flight factor information from flight factor measuring instruments to the pilot of an aircraft through the tactile sense of his hands without the necessity of making visual readings of such flight instruments which comprises an altitude measuring device, a speed measuring device and a turn indicating device, a control element operated by the pilot during flight to control the flight of the aircraft, a tactile unit for indicating altitude measurements, a tactile unit for indicating speed measurements and a tactile unit for indicating deviations in turn measurements, each of said tactile units being mounted on the control element so as to be accessible to a hand of the pilot in the normal flying position and means operably controlled by each of said measuring device connecting each of said measuring devices to a corresponding tactile unit for transmitting the quantitative measurements of altitude, speed and turn from each of said measuring devices to the corresponding unit.

9. A device for transmitting flight factor information from flight factor measuring instruments to the pilot of an aircraft through the tactile sense of his hands without the necessity of making visual readings of such flight instruments which comprises an altitude measuring device having means for setting the instrument for a predetermined altitude and for indicating the differential from said predetermined altitude in terms of measurement indications above and below the said predetermined altitude for which the altitude measuring device is set, a speed measuring device having means for setting the instrument to indicate measurements in terms of a predetermined desired speed and for indicating the differential from the said predetermined speed in terms of measurement indications above and below said predetermined speed for which the speed instrument is set, a turn indicating device having means for setting the same to indicate the differential from a predetermined direction in terms of measurement indications, a control element operated by the pilot during flight to control the flight of the aircraft, a tactile unit for indicating altitude measurements in terms of deviations from the predetermined desired altitude for which the altitude device is set, a tactile unit for indicating speed measurements in terms of deviations from the predetermined desired speed for which the speed measuring device is set, a tactile unit for indicating turn measurements in terms of deviations from the predetermined direction, means for mounting each of said tactile units in fixed position on the control element of the aircraft so as to be accessible to the hands of the pilot in the normal flying position and connecting means from each of said devices to the corresponding tactile unit operably controlled by each of said devices for transmitting the said measurement indications to the said units, thus bringing together and coordinating the said measurement indications under the hands of the pilot.

10. A device for transmitting flight factor information from flight factor measuring instruments to the pilot of an aircraft through the tactile sense of his hands without the necessity of making a visual reading of such instruments which comprises a set of independent flight factor measuring instruments, a control element operated by the pilot during flight to control the flight of the aircraft, said control element having a wheel thereon, a set of tactile units mounted on the wheel of the control element so as to be accessible to the fingers of the pilot, each of said units having a movable element adapted for movement in response to changes in measurement indications of the instrument with which the units are associated, and means operably controlled by said measuring instruments connecting each of said instruments to the corresponding unit with which it is associated for transmitting the quantitative flight factor measurement indications from the said instruments to the said units.

11. A device for transmitting flight factor information from flight factor measuring instruments to the pilot of an aircraft through the tactile sense of his hands without the necessity of making the visual reading of such instruments which comprises a set of independent flight factor measuring instruments including instruments for measuring altitude, air-speed and turn, a control element operated by the pilot during flight to control the flight of the aircraft, said control element having a wheel thereon, a tactile unit for indicating altitude mounted so as to be accessible to a digit of the pilot's hands in normal flying position, means for adjusting said altimeter instrument so as to provide a corresponding setting on said tactile unit as the desired altitude to be maintained and means whereby the said tactile unit connected to the altimeter instrument indicates the differential between the actual altitude and the predetermined desired altitude to be maintained, a tactile unit for indicating air-speed mounted so as to be accessible to another digit of the pilot's hands, a series of tactile units mounted on the said wheel for indicating degrees of turn from each side of the neutral position of the turn indicator and means operably controlled by said measuring instruments connecting each of said instruments to the corresponding tactile units with which they are associated for transmitting the quantitative flight factor measurement indications therefrom to the said units.

12. A device for transmitting flight factor information from flight factor measuring instruments to the pilot of an aircraft through the tactile sense of his hands so as to provide coordinated flight factor indications as to flight factor conditions which comprises a set of independent flight factor measuring instruments including instruments for measuring altitude, air-speed and turn, a control element operated by the pilot during flight to control the flight of the aircraft, a tactile unit for indicating altitude mounted in connection with the control element so as to be accessible to the pilot's hands in normal flying position, a tactile unit for indicating air speed mounted in connection with the control element so as to be accessible to the pilot's hands in normal flying position, means for adjusting at least one of said instruments so as to indicate a predetermined desired factor to be maintained and means whereby the corresponding tactile unit or units connected thereto indicates the differential between the actual factor measurement and the predetermined desired factor measurement to be maintained, a series of other tactile units mounted in connection with the control element for indicating degrees of turn from each side of the neutral position of the turn indicator and connecting means operably controlled by each of said instruments and connected to the corresponding tactile units with which they are associated for transmitting the quantitative flight factor measurement indications from the said instruments to the said units.

13. A device for transmitting flight factor information from flight factor measuring instruments to the pilot of an aircraft through the tactile sense of his hands so as to provide coordinated flight factor indications which comprises the usual instruments for visual reading on the instrument board including the altimeter and speedometer, a separate altitude measuring device and a separate speed measuring device, means connected to said measuring devices for referring the measurement indication thereof to zero or to a predetermined flight factor measurement indication, means in connection with the instrument board for adjusting the measurement indication to the desired value to be maintained, a control element operated by the pilot during flight to control the flight of the aircraft, a tactile unit connected to each of said measuring devices for indicating said quantitative measurements referred to zero or to the predetermined flight factor to be maintained, means for mounting the said units on the control element of the aircraft so as to be accessible to the hands of the pilot in the normal flying position, means for adjusting said tactile units so as to indicate the measurement difference between the actual factor measurement and the desired factor measurement to be maintained and connecting means operably controlled by said measuring devices for transmitting the quantitative flight factor measurement indications from each of said measuring devices to the corresponding tactile unit connected thereto in terms referred to zero or by differential measurements referred to the predetermined value.

14. A device for transmitting flight factor information from flight factor measuring instruments to the pilot of an aircraft through the tactile sense of his hands so as to provide coordinated flight factor measurement indications which comprises a control element operated by the pilot during flight to control the flight of the aircraft, a set of independent flight factor measuring instruments at least one of which is a direct factor measuring instrument and others of which are adapted to give flight factor measurement indications referred to a predetermined desired flight factor measurement as a means of comparison for maintaining the desired flight condition, a series of tactile units each of which is connected to one of the said flight factor measuring instruments, means for setting the tactile units connected to the instruments for indicating the flight factor in comparison with a predetermined desired flight factor so as to indicate measurements in comparison therewith, said series of tactile units being mounted in connection with the control element in juxtaposition to each other in fixed position so that the tactile indications thereof are coordinated to give simultaneous indications of the flight factors in comparison with the desired flight factors to be maintained and connecting means operably controlled by the corresponding measuring instrument from each of said instruments to the corresponding tactile units with which they are associated for transmitting the quantitative flight factor measurement indications from the instruments to the said tactile units.

15. A device for transmitting flight factor information from flight factor measuring instruments to the pilot of an aircraft through the tactile sense of his hands so as to provide coordinated flight factor measurement indications which comprises a control element operated by the pilot during flight to control the flight of the aircraft, a set of independent flight factor measuring instruments, means in said instruments for measuring flight factors directly as referred to zero and also as referred to a predetermined desired flight factor measurement for comparison in maintaining the desired flight factor, means for amplifying the measurements of said instruments, a series of tactile units each having a movable element and a reference element, each unit of which is connected to one of the said eight factor measuring instruments, means for setting the said instruments so that the tactile units indicate the flight factor in terms of a differential in comparison with a predetermined desired flight factor, said series of tactile units being mounted in grouped relation to the control element so that the tactile indications obtained by the pilot by manual touch are coordinated to give totalized or simultaneous indications of the flight factors in comparison with the desired flight factors to be maintained and means operably controlled by the measuring instrument to which it is connected connecting each of said instruments to the corresponding tactile unit for transmitting the quantitative flight factor measurement indications from the instruments to the said tactile units.

16. A device for transmitting flight factor information from a flight factor measuring instrument to the pilot of an aircraft through the tactile sense of his hand without the necessity of making a visual reading of such flight instrument which comprises an altitude measuring device having the usual aneroid bellows, means for communicating the movements of the bellows to a series of levers by which the movement is amplified, means in said device by which differences in altitude may be measured with reference to a predetermined altitude, means connected with said levers to produce actuation in accordance with variations from the predetermined altitude, a control element operated by the pilot during flight to control the flight of the aircraft, a tactile unit having a movable element for indicating measurements of said measuring device in terms of variations from the predetermined altitude, said tactile unit being mounted on the control element so as to be accessible to a hand of the pilot in the normal flying position and connecting means operably controlled by said measuring device for transmitting the quantitative flight factor measurement indication from the said measuring device to said movable element, so as to indicate the amount of variation from the predetermined altitude to be maintained or from sea-level as may be desired.

17. A device for transmitting flight factor information from a flight factor measuring instrument to the pilot of an aircraft through the tactile sense of his hand which comprises a quantitative flight factor measuring device, a relay circuit connected to the said factor measuring device, a motor connected to the relay circuit, a control element operated by the pilot during flight to control the flight of the aircraft, said control element, a tactile unit having a reference element and a movable element for indicating said quantitative measurements, said tactile unit being mounted in connection with the control element so as to be accessible to the hand of the pilot in the normal flying position and means connecting the said motor with the said tactile unit so as to operate the same in accordance with changes in the factor measurement indications of the said factor measuring device.

18. A device for transmitting flight factor information from a flight factor measuring instrument to the pilot of an aircraft through the tactile sense of his hand which comprises a quantitative flight factor measuring device, means for modifying the set of the flight factor measuring part thereof so as to measure the flight factor as a differential from the amount for which it is set, a relay circuit connected to the said factor measuring device, a motor connected to the relay circuit, a control element operated by the pilot during flight to control the flight of the aircraft, a tactile unit having a reference element and a movable element for indicating said quantitative measurements with reference to zero or as a differential from the amount for which the said measuring device is set, said tactile unit being mounted in connection with the control element so as to be accessible to the hand of the pilot in the normal flying position and means operably controlled by said motor connecting the said motor with the movable element of said tactile unit so as to operate the same in accordance with operations of the motor with changes in the factor measurement indications of the said factor measuring device.

19. A device for transmitting flight factor information from a flight factor measuring instrument to the pilot of an aircraft through the tactile sense of his hand which comprises a quantitative flight factor measuring device having an aneroid bellows, a spring member connected thereto, and a movable arm adapted to move with movements of the said bellows, means for modifying the tension on said spring so as to change the set of the flight factor measuring device to measure the flight factor as a differential from the amount for which it is set, a relay circuit connected to the said factor measuring device, a motor connected to the relay circuit, a control element operated by the pilot during flight to control the flight of the aircraft, a tactile unit having a reference element and a movable element for indicating said quantitative measurements with reference to zero or as a differential from the amount for which the said measuring device is set, said tactile unit being mounted in connection with the control element so as to be accessible to the hand of the pilot in the normal flying position and means operably controlled through said motor connecting the said motor with the movable element of said tactile unit so as to operate the same in accordance with movements of said arm by which the said relay is caused to operate to produce operation of the motor with changes in the factor measurement indications of the said factor measuring device.

20. A device for transmitting altitude indications from an altitude measuring instrument to the pilot of an aircraft through the tactile sense of his hand which comprises an altitude measuring device having an aneroid bellows and a movable arm adapted to move in accordance with movements of the said bellows, contact means for closing electric circuits with forward and return movements of the arm, a relay circuit connected to the said contact means, a motor connected to the relay circuit, means connecting the motor with the relay circuit so as to cause rotation of the motor in a forward or reverse direction with movements of the said arm into contact with the circuit closing means in the forward and return movements of the arm, a control element operated by the pilot during flight to control the flight of the aircraft, a tactile unit having a reference element and a movable element for indicating said altitude measurements with reference to zero or as a differential from the amount for which the said altitude instrument is set, said tactile unit being mounted in connection with the control element so as to be accessible to a hand of the pilot in the normal flying position and means connecting the said motor with the movable element of said tactile unit so as to operate the same in a forwardly and return direction so as to accurately indicate deviations in altitude from the predetermined altitude for which the instrument is set in accordance with movements of the arm by which the said relay is caused to operate to produce operation of the motor with changes in altitude.

21. A device for transmitting speed measurements from a speed measuring apparatus to the pilot of an aircraft through the tactile sense of his hand which comprises a speed measuring apparatus having the usual aneroid bellows together with a dynamic air tube and a static air tube for creating a differential pressure on the aneroid bellows, an arm member operatively connected to said aneroid bellows so as to operate in accordance with fluctuations of the said bellows, the said arm member being adapted to amplify the movements of the aneroid bellows, a relay circuit, a series of contact points mounted in connection with said arm member so as to close the relay circuit in one direction or the other with contacting movements of the arm from its neutral position, a motor connected to said relay circuit so as to be operated in a forward or reverse direction in accordance with circuit closing movements of the arm in one direction or the other, a control element operated by the pilot during flight to control the flight of the aircraft, a tactile unit having a reference element and a movable element mounted in connection with said control element so as to be accessible to the hand of the pilot in the normal flying position, means operably controlled by said motor for connecting said motor to said movable element for indicating the speed measurement in accordance with movements of said arm member and means for referring the indications of said movable element to the reference element so as to measure a differential from a predetermined desired speed.

22. A device for transmitting turn indications from a turn indicating instrument to the pilot of an aircraft through the tactile sense of his hands without the necessity of making visual readings of the turn indicator which comprises a turn indicator having the usual pointer, a series of contact members mounted on each side of the neutral position of the pointer, a control element operated by the pilot during flight to control the flight of the aircraft, a series of tactile units for indicating degrees of turn mounted in connection with said control element so as to be accessible to the hands of the pilot in the normal flying position and connections from said contact members to the said tactile units operably controlled by said turn indicating instrument for indicating the degrees of turn on the tactile units in accordance with movements of the said pointer into contact with said contact members on either side of the neutral position of said pointer.

23. A device for transmitting turn indications from a turn indicating instrument to the pilot of an aircraft through the tactile sense of his hands without the necessity of making visual readings of said turn indicator which comprises a turn indicator having a pointer, a series of contact members on each side of the neutral position of said pointer, a control element operated by the pilot during flight to control the flight of the aircraft, a tactile unit connected to each of said contact members by an electrical circuit so that as said pointer moves into contact with each of said contact members the electrical circuit will be completed, the tactile units being mounted in connection with said control element so as to be accessible to the hands of the pilot in the normal flying position and electrically operated means operably controlled by said turn indicating instrument for operating the said tactile units when the circuit through the said contact members is completed.

24. A device for transmitting turn indications from a turn indicating instrument to the pilot of an aircraft through the tactile sense of his hands without the necessity of making visual readings of the turn indicator which comprises a turn indicator having a pointer and a series of contact members mounted on each side of the neutral position of the said pointer, means for electrically connecting the said contact members in circuit with a source of current when the said pointer contacts with each of said contact members, a control element operated by the pilot during flight to control the flight of the aircraft, a series of tactile units having a movable element for indicating degrees of turn, said tactile units being mounted in connection with said control element so as to be accessible to the hands of the pilot in the normal flying position and a solenoid connected to each of the said tactile units so as to operate the said movable element thereof when the current through the said contact members is closed.

HORACE STARK.